Sept. 29, 1959 P. F. SMITH 2,906,819
DATA READING MACHINE
Filed July 6, 1954 18 Sheets-Sheet 1

INVENTOR.
PERRIN F. SMITH
BY
John B. Sponsler
AGENT

Sept. 29, 1959  P. F. SMITH  2,906,819
DATA READING MACHINE
Filed July 6, 1954  18 Sheets-Sheet 2
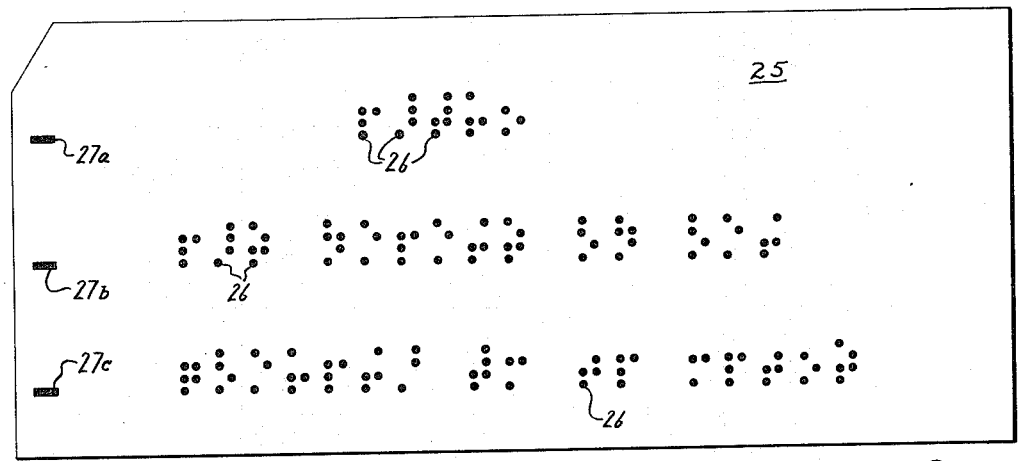
FIG. 4
FIG. 2
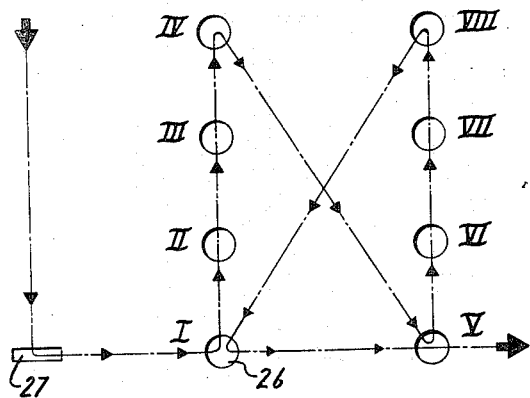
FIG. 3

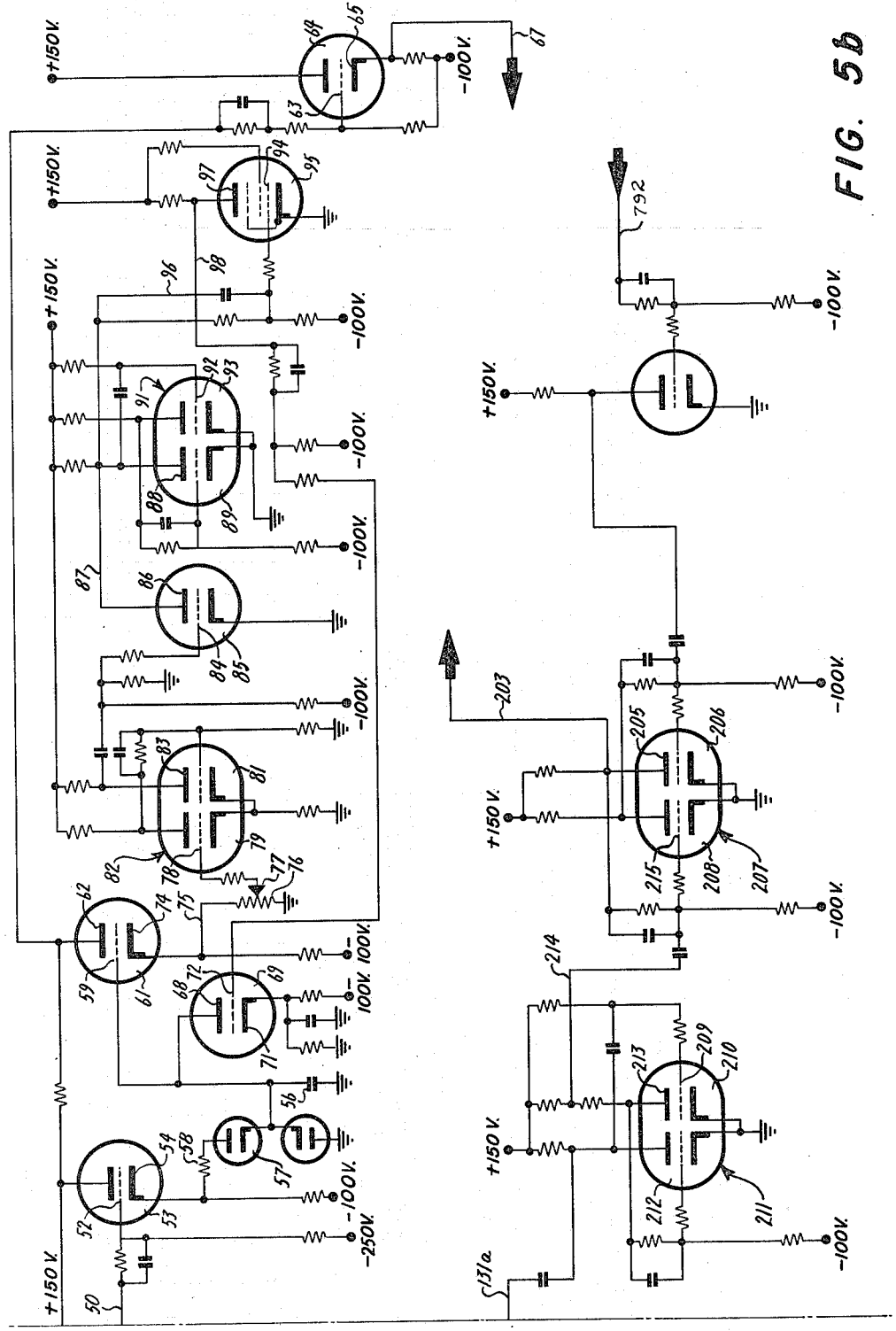

Sept. 29, 1959   P. F. SMITH   2,906,819
DATA READING MACHINE
Filed July 6, 1954   18 Sheets-Sheet 12

Sept. 29, 1959

P. F. SMITH 2,906,819

DATA READING MACHINE

Filed July 6, 1954

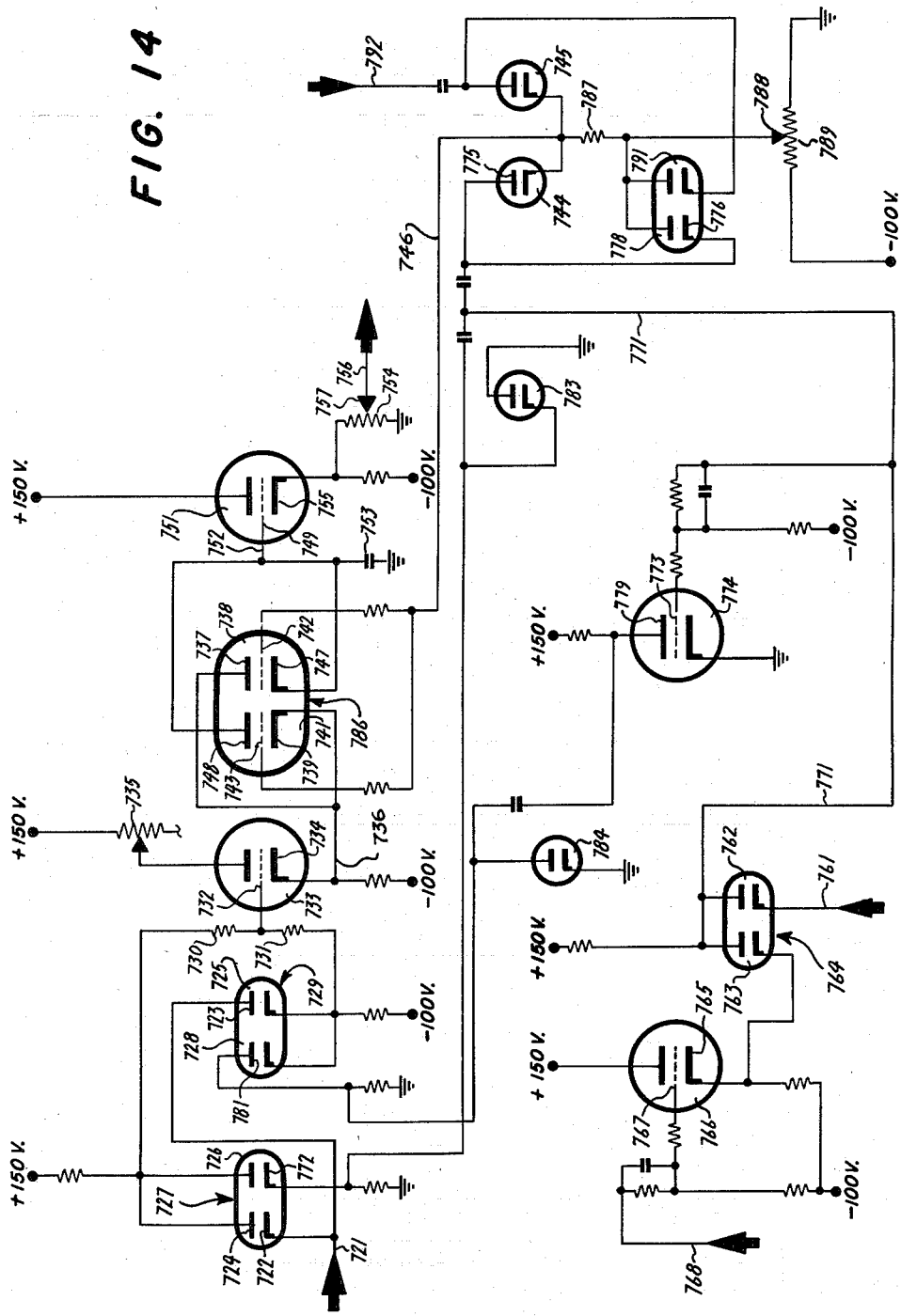

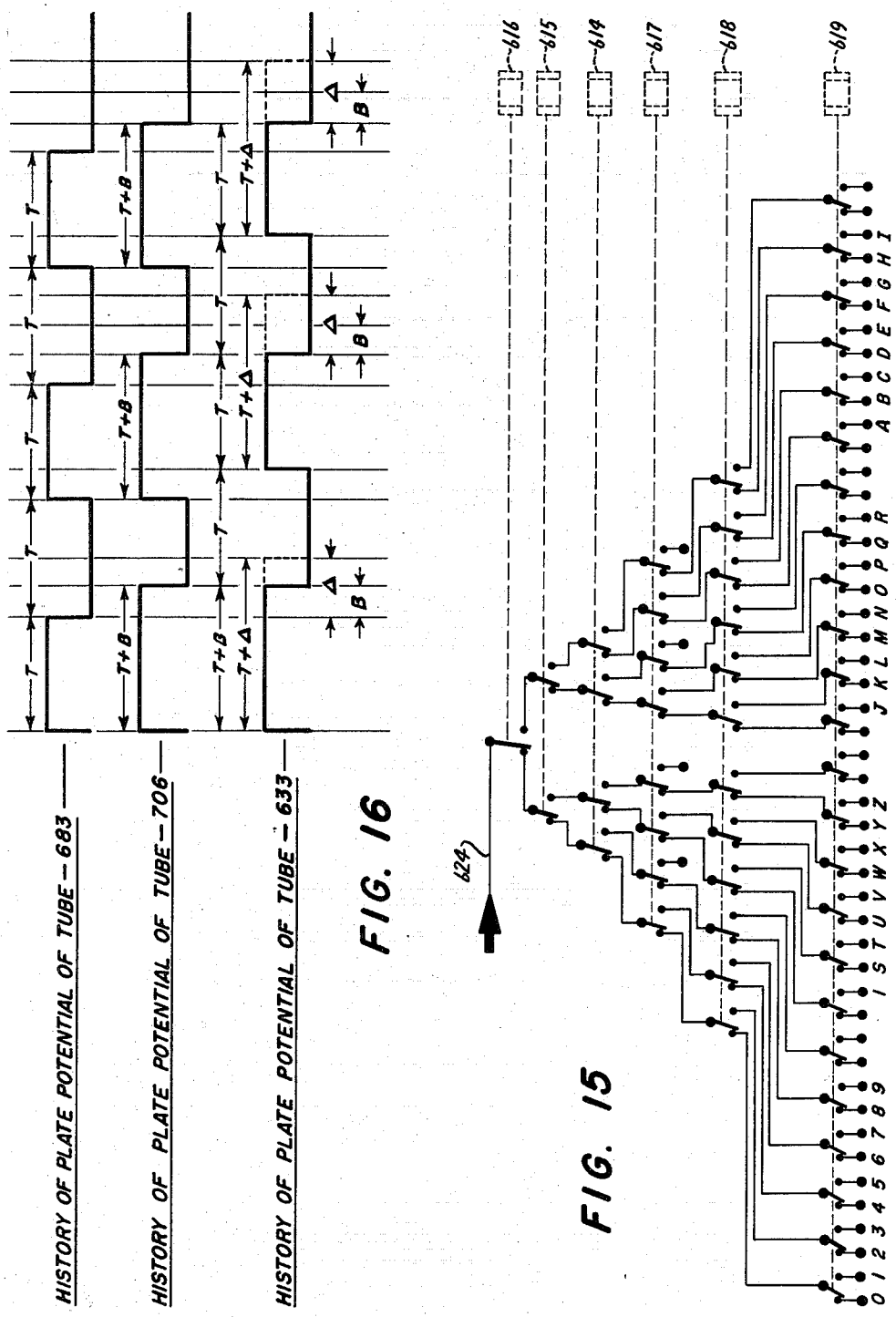

United States Patent Office 2,906,819
Patented Sept. 29, 1959

2,906,819

DATA READING MACHINE

Perrin F. Smith, Santa Clara County, Calif., assignor to International Business Machines Corporation, New York, N.Y., a corporation of New York Application July 6, 1954, Serial No. 441,237

14 Claims. (Cl. 178—17)

The present invention apertains generally to data reading machines, and more particularly it relates to data reading machines utilizing a flying spot scanning system.

It is an object of this invention to provide an improved data reading machine which is capable of reading information at a very high rate of speed.

Another object is to provide a groping reader, i.e., a reader which is adapted to look for, locate and read information from a document.

A further object is to provide a reader employing a flying spot scanning system arranged to scan only those portions of a document upon which information is stored.

Still another object is to provide a reader of the type described which is controlled first to scan a portion of a document to sense the presence of a line of characters, second to scan a line of characters so sensed, and third to scan each character in a sensed line to determine its identity.

A still further object is to provide a novel means for skew correction.

Another object is to provide a reader not adversely affected by moderate skew of a document to be read.

Still another object is to provide a reader adapted to scan a line of characters and arranged to correct for skew, if necessary, at each character in a line.

A further object is to provide a reader arranged to grope for characters to be read whereby the dimensional characteristics of the document need be relatively stable only over the small area upon which a character is recorded.

Other objects of the invention will be pointed out in the following description and claims and illustrated in the accompanying drawings, which disclose, by way of example, the principle of the invention and the best mode which has been contemplated of applying that principle.

In the drawings:

Fig. 2 is an illustration of a document capable of being read by the novel reader.

Fig. 3 is a diagrammatic illustration of a read cycle.

Fig. 4 is a suggested code for utilization with the reader.

Figure 5A:
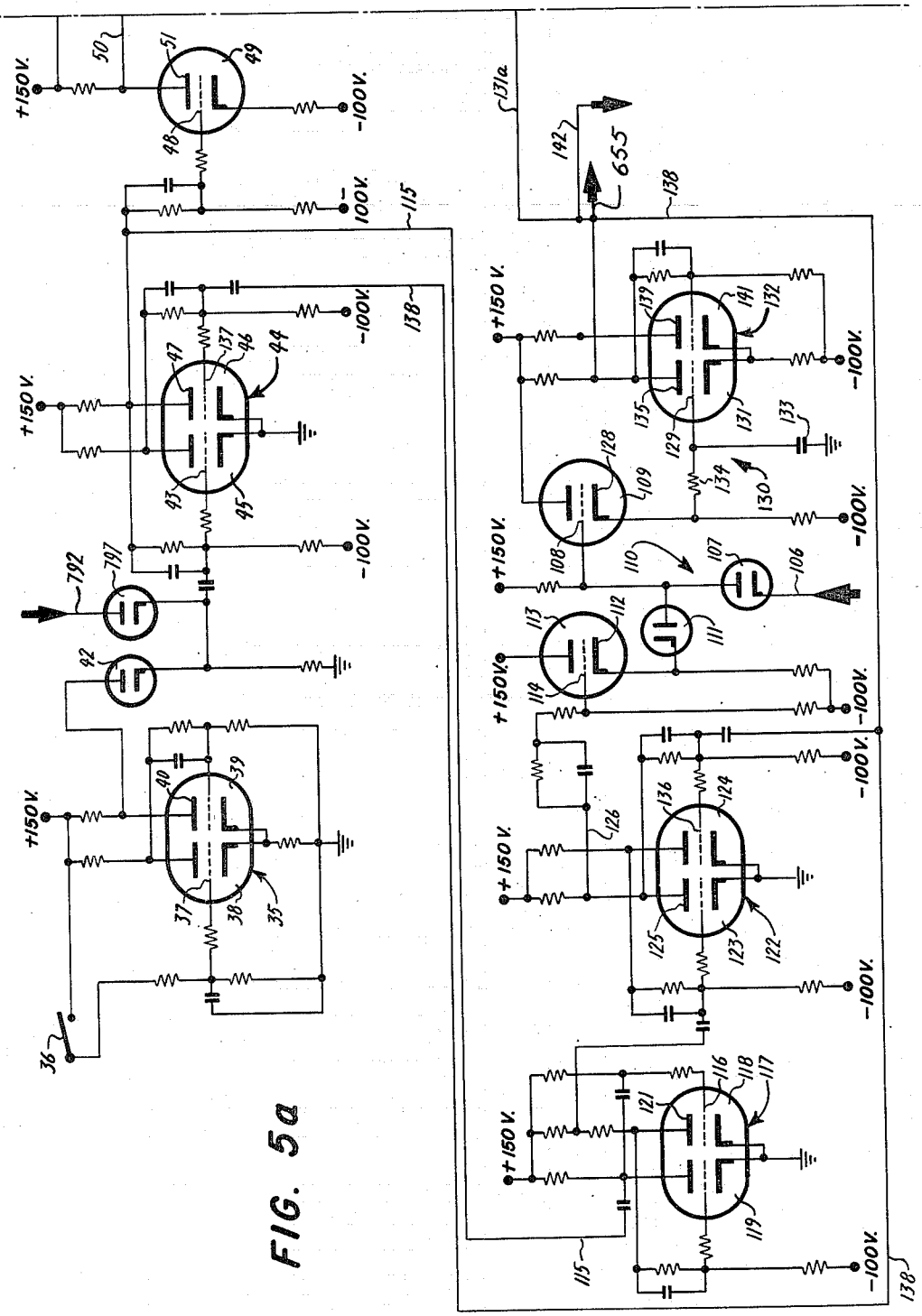

Figs. 5a and 5b comprise a schematic diagram of the vertical sweep circuit.

Figure 6:
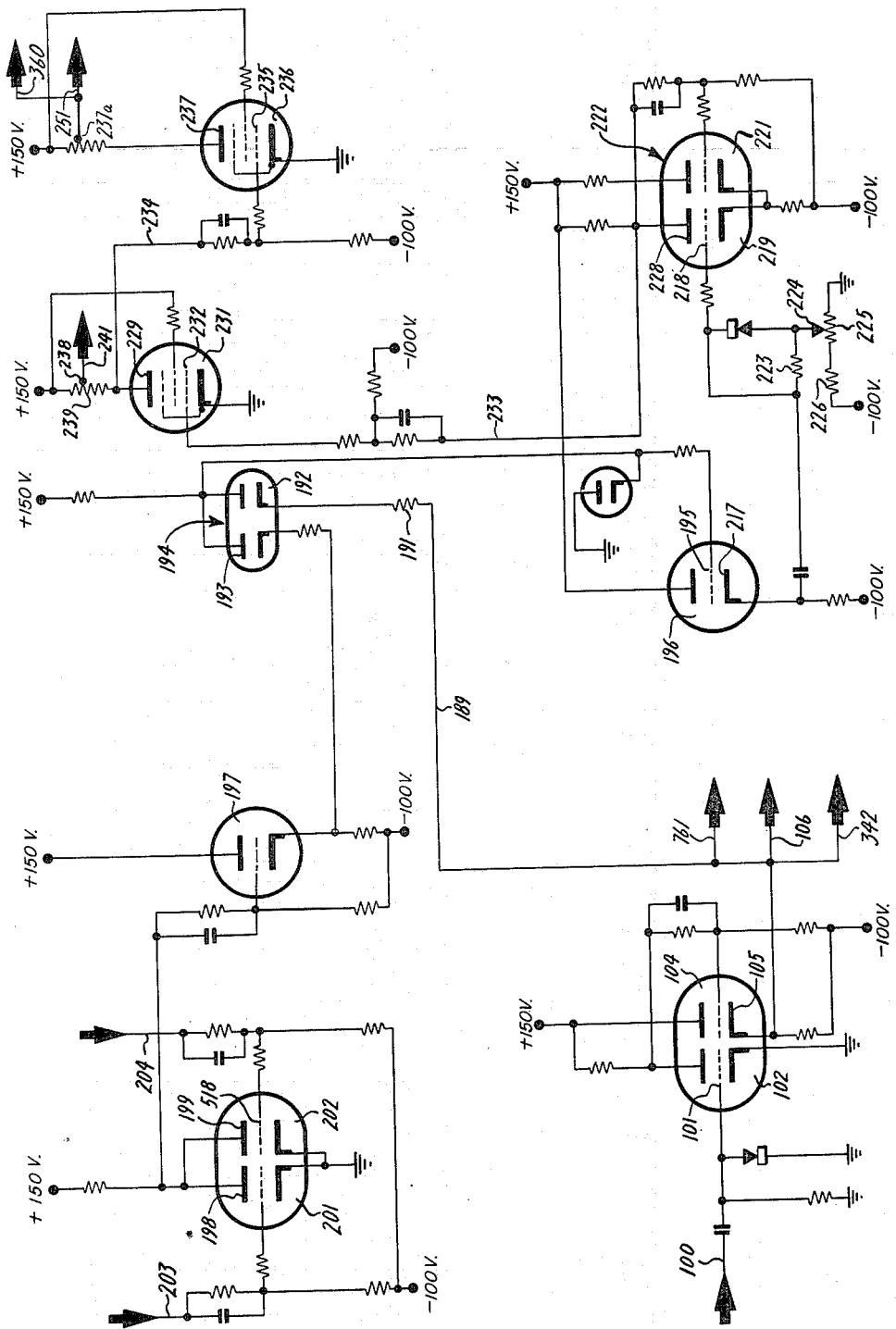

Fig. 6 is a schematic diagram of the pulse shaper.

Figure 7:
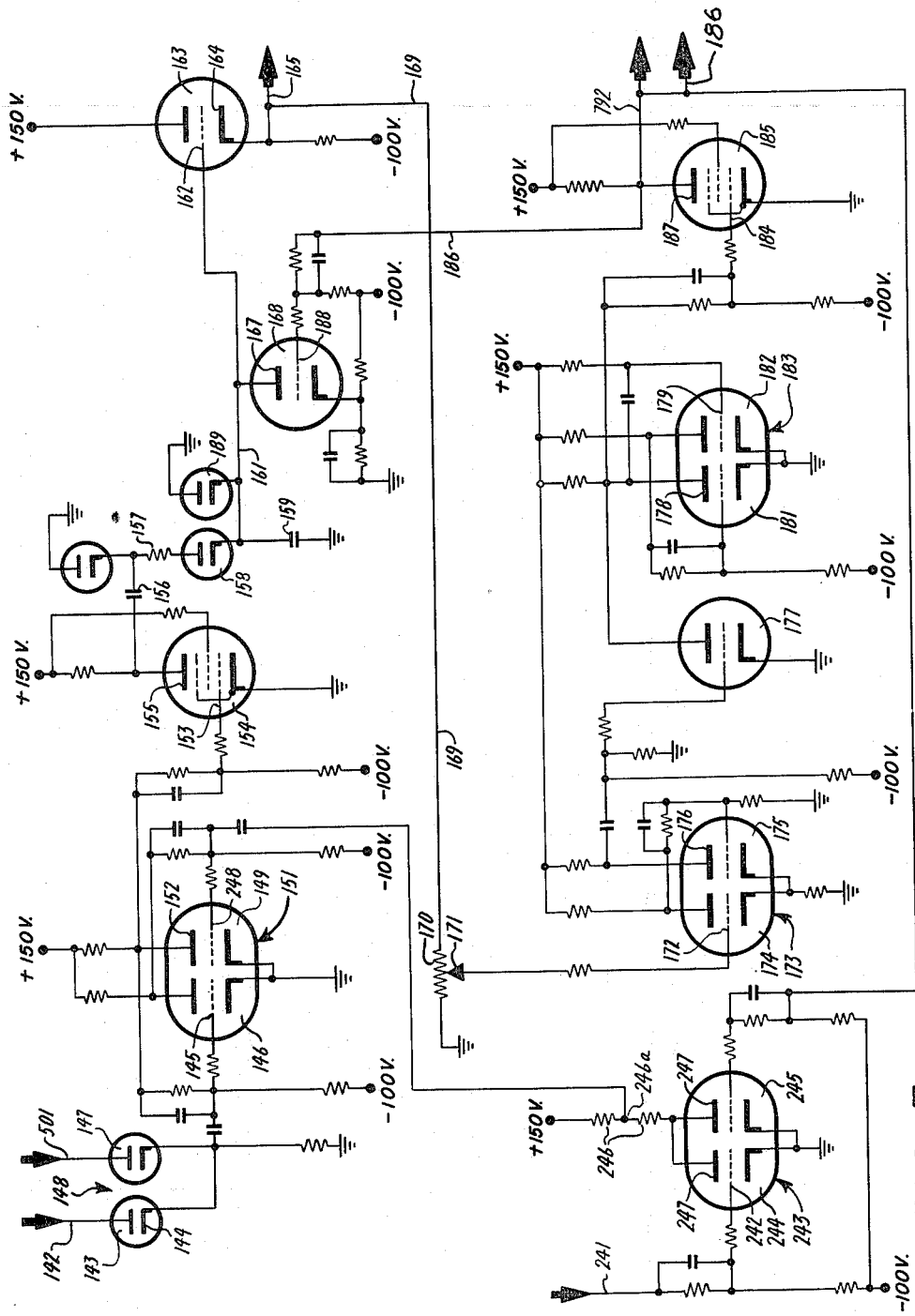

Fig. 7 is a schematic diagram of the horizontal sweep circuit.

Figure 8A:
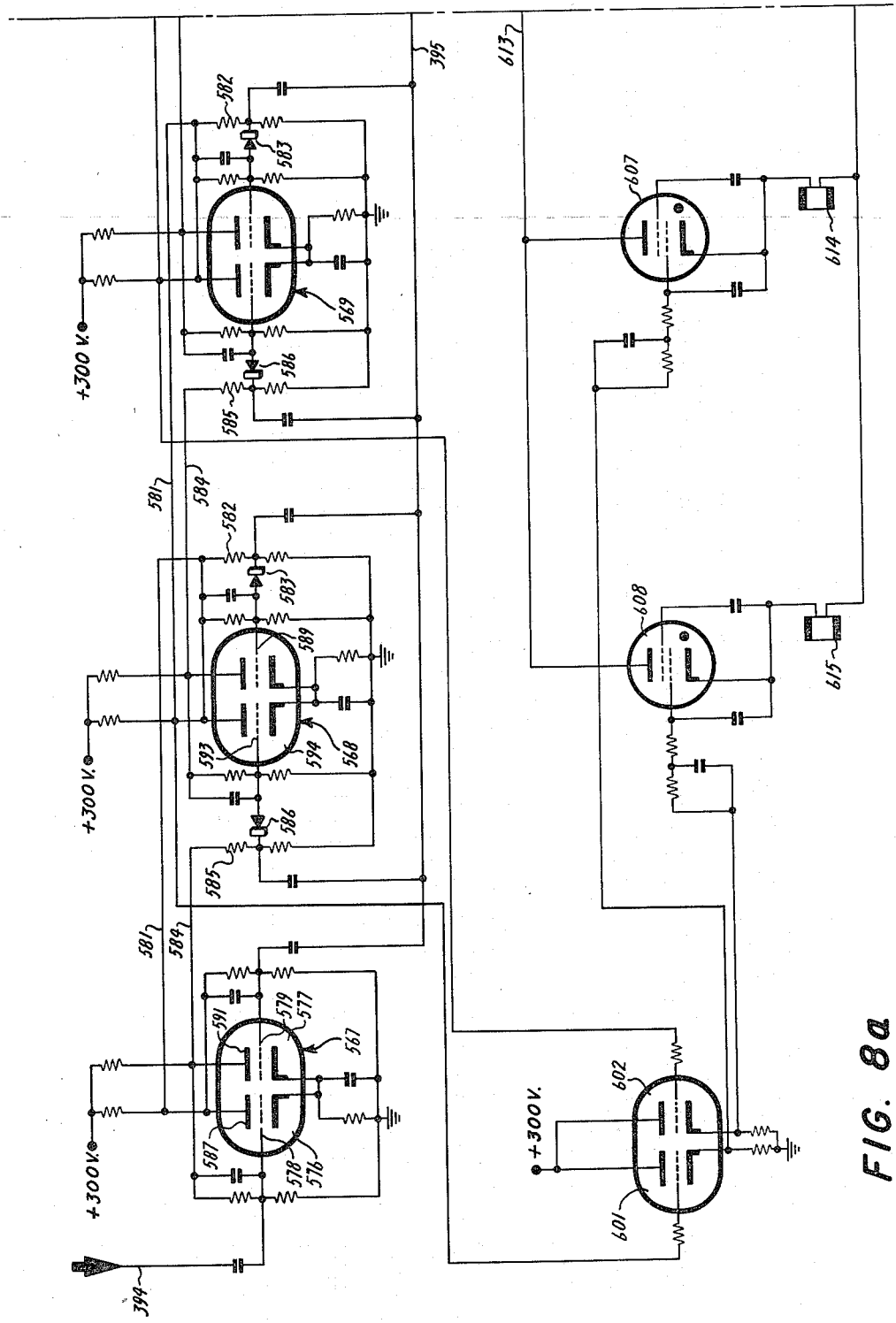
Figure 8B:
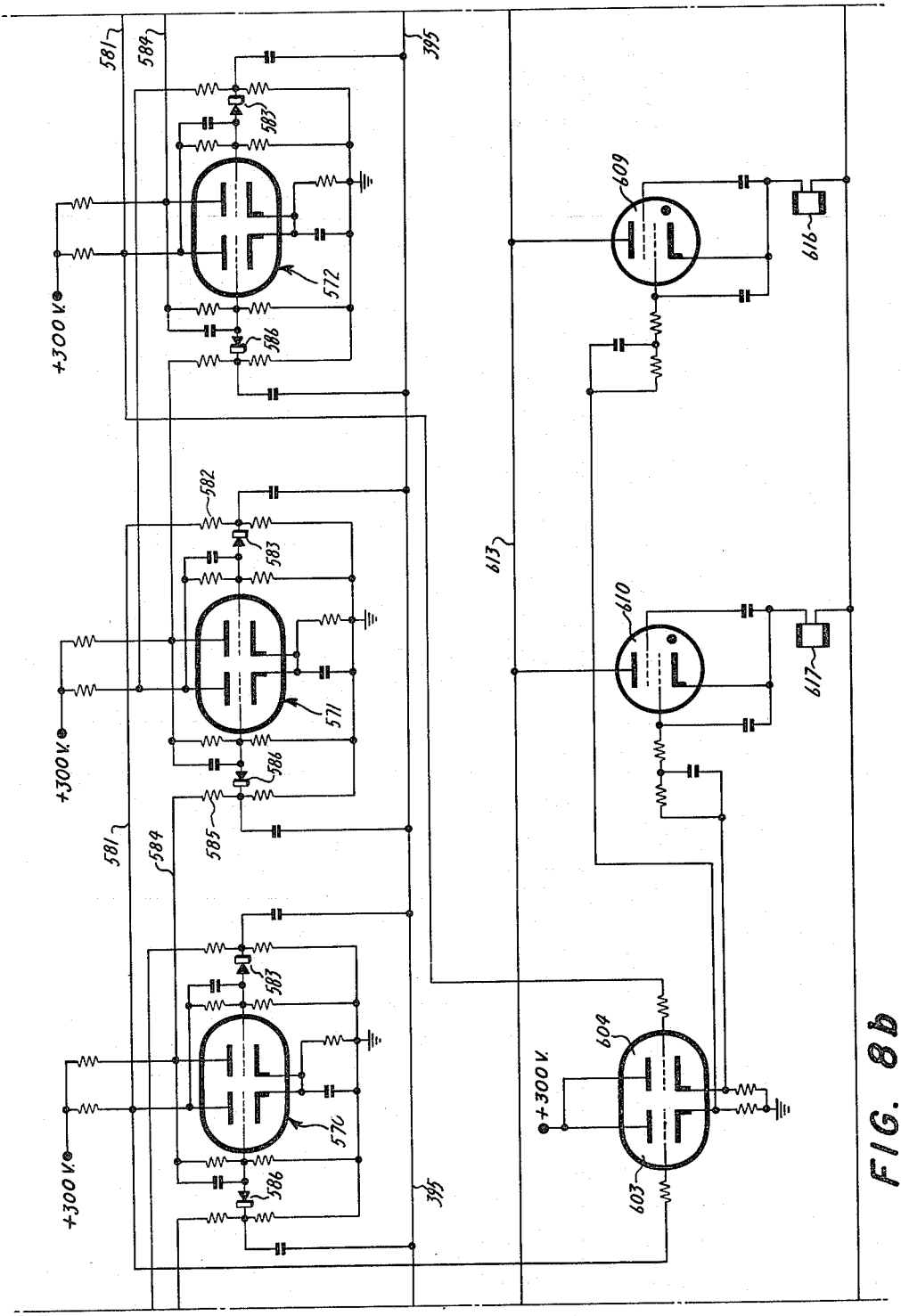
Figure 8C:
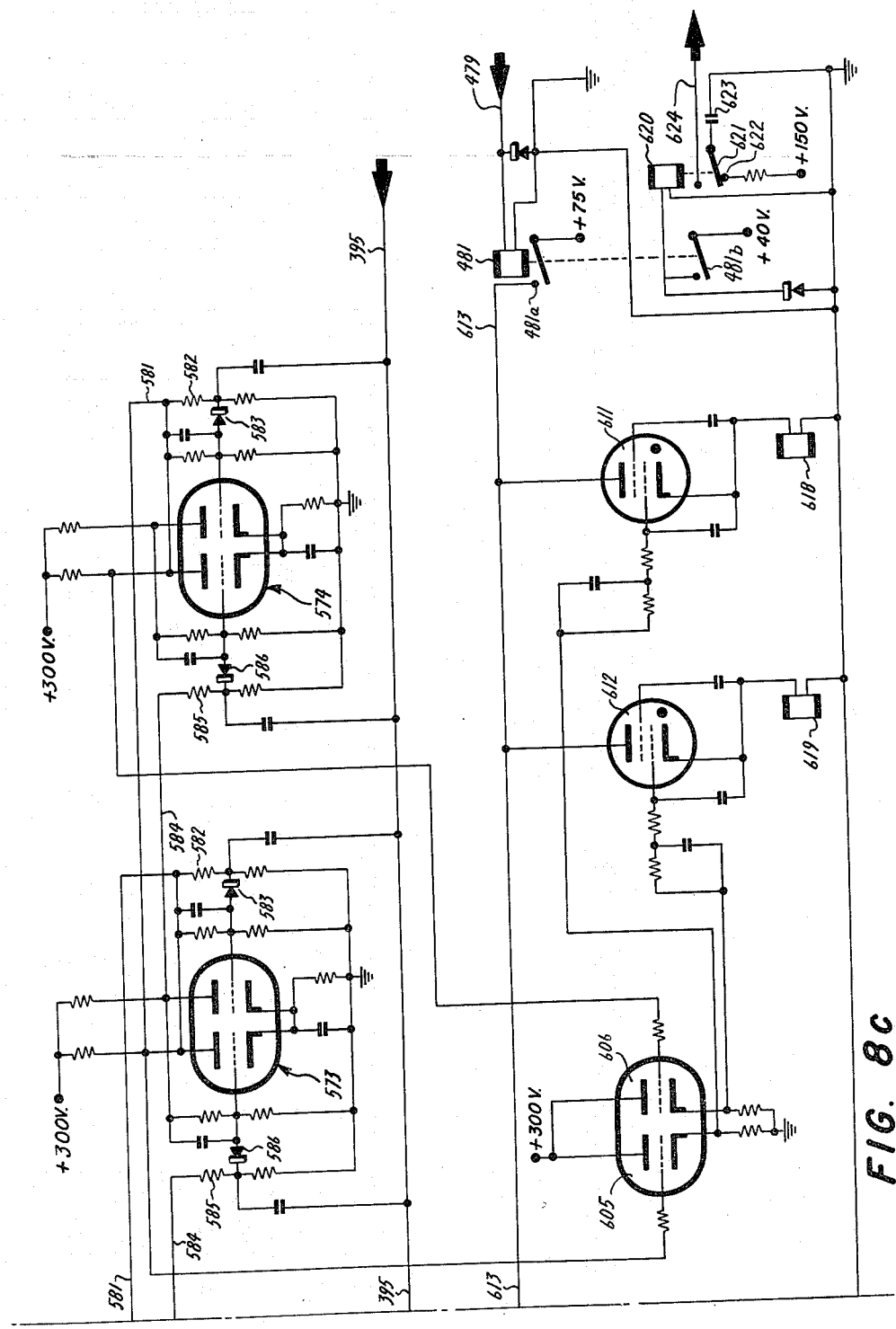

Figs. 8a, 8b and 8c comprise a schematic diagram of the shift register utilized herein.

Figure 9A:
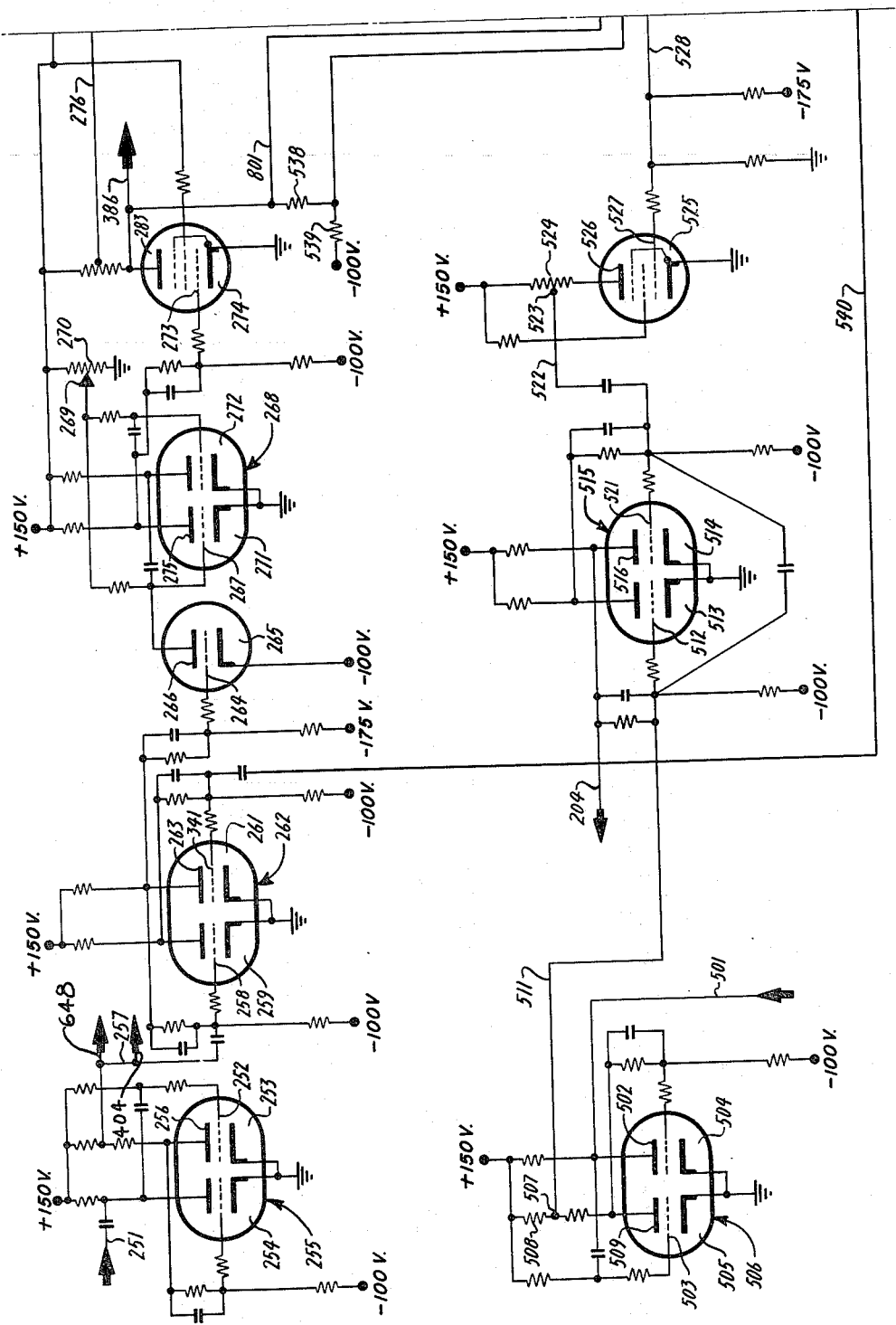
Figure 9B:
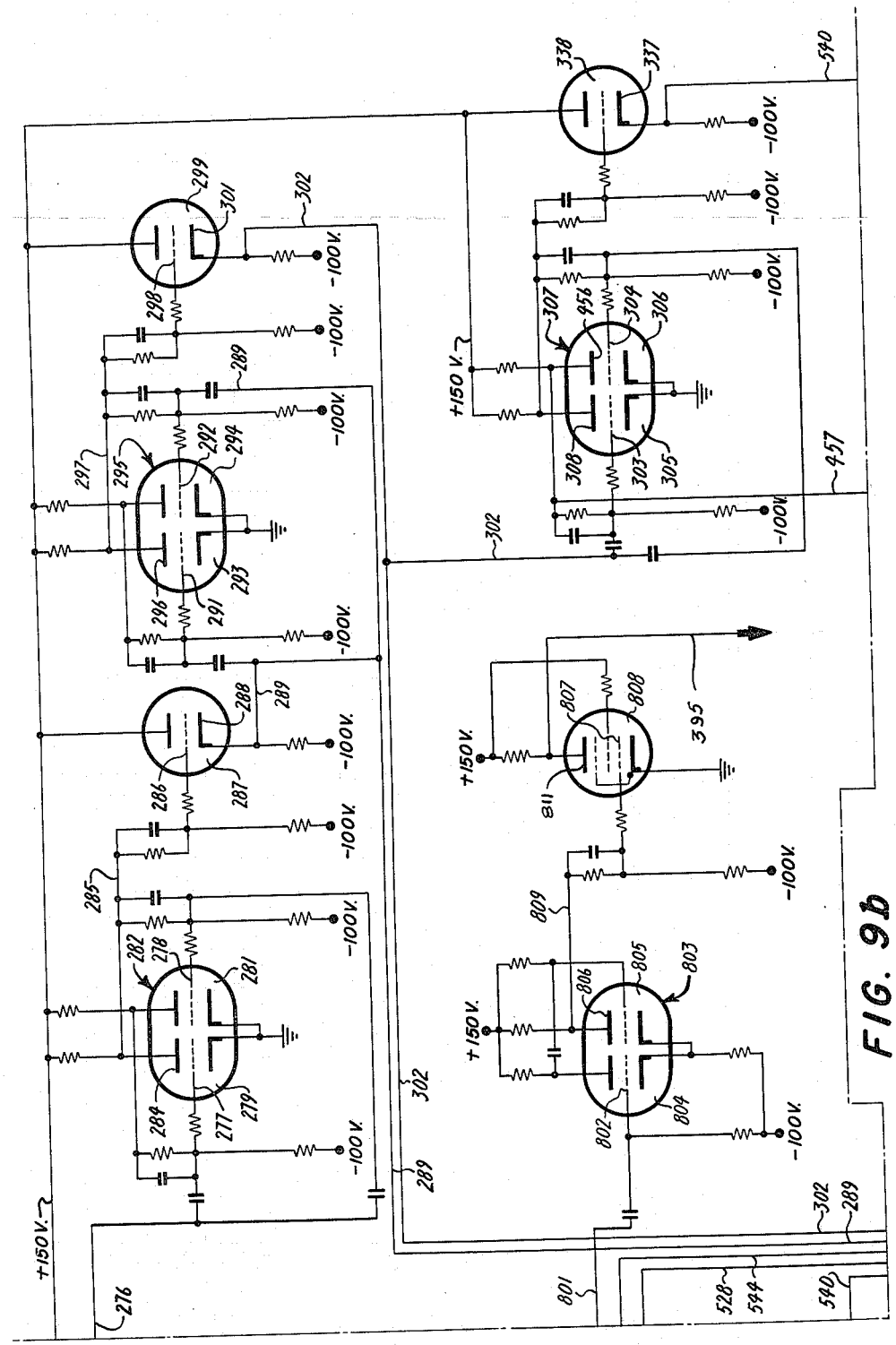
Figure 9C:
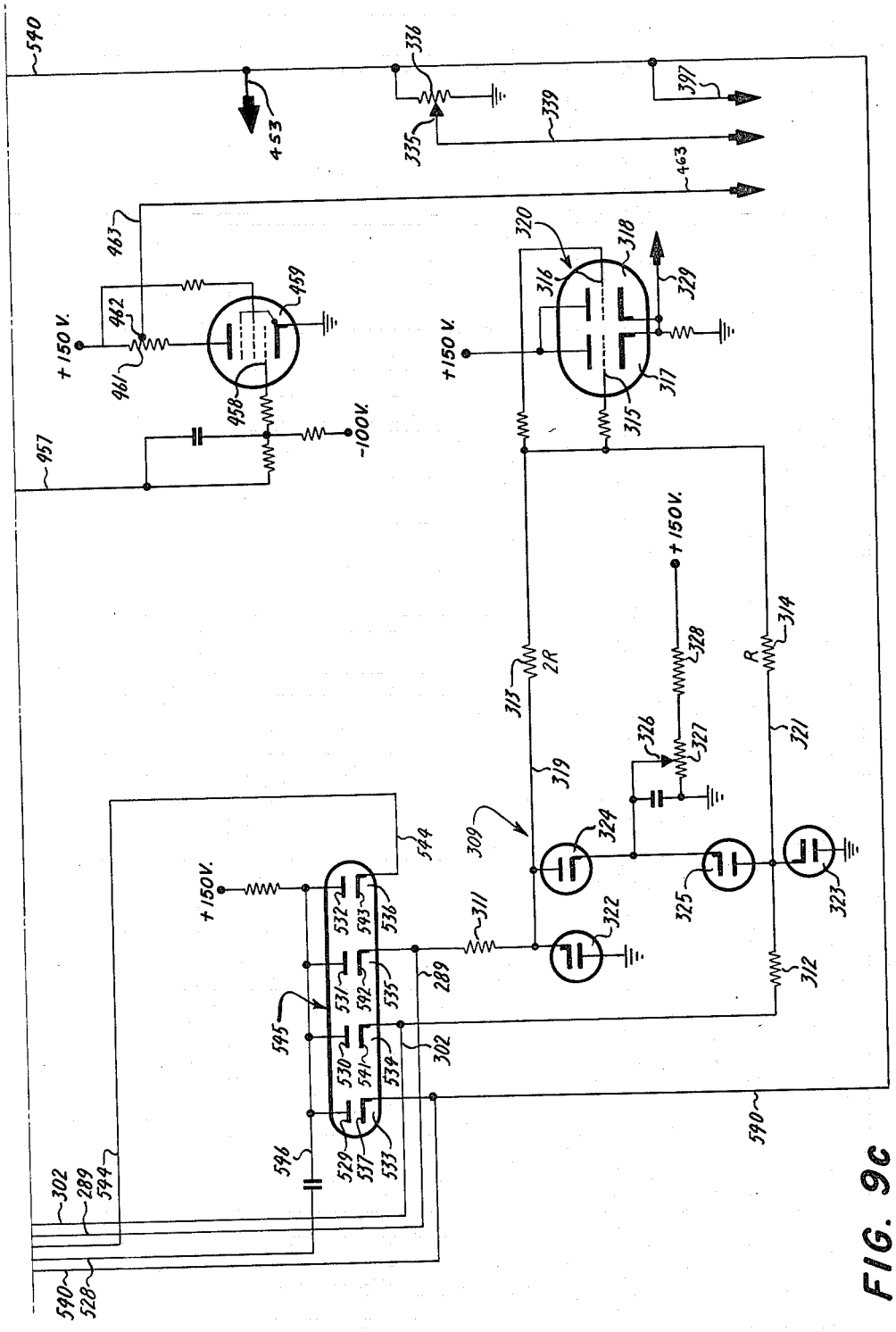

Figs. 9a, 9b, and 9c comprise a schematic diagram of the read cycle generator.

Figure 10:
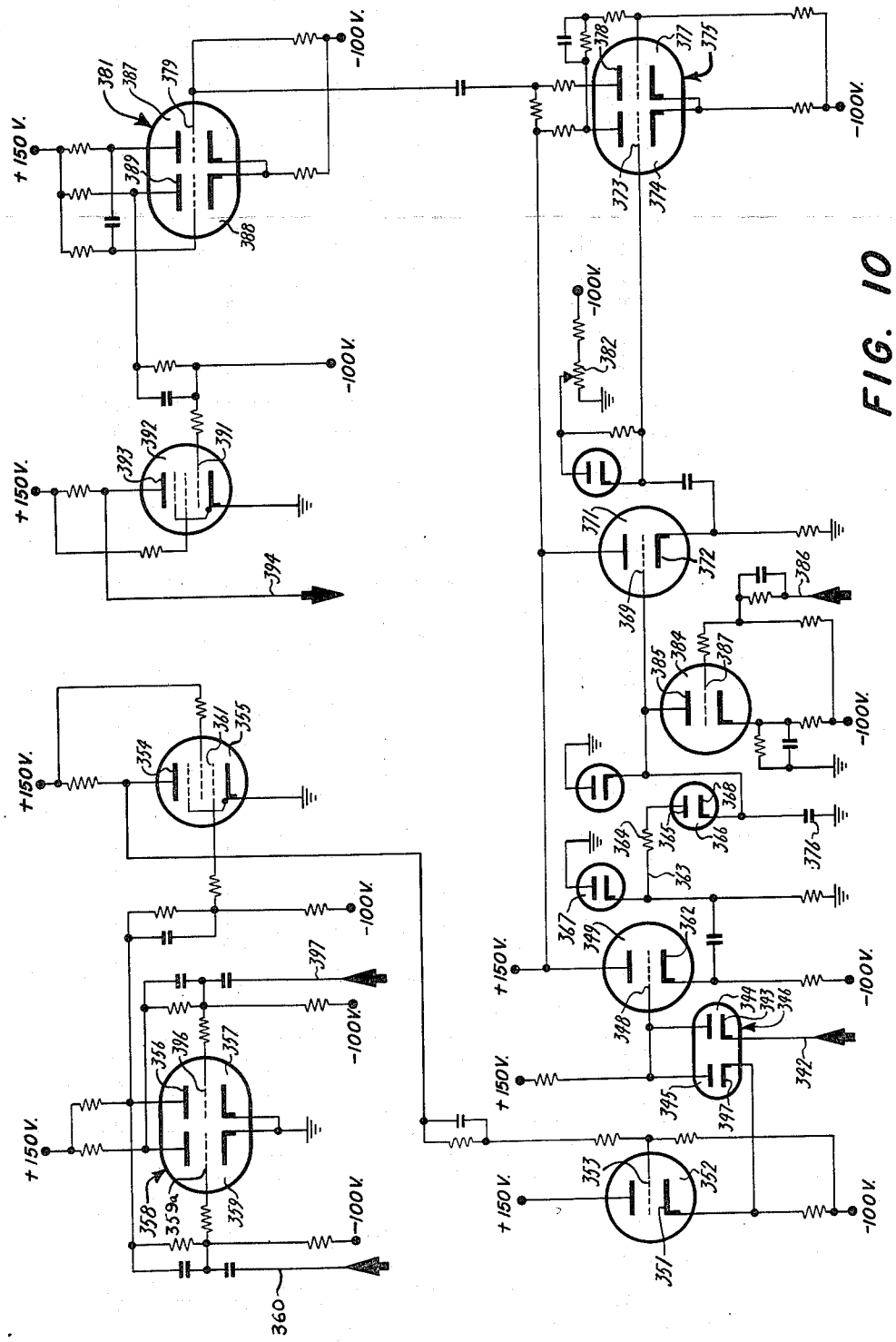

Fig. 10 is a schematic diagram of the detector.

Figure 11:
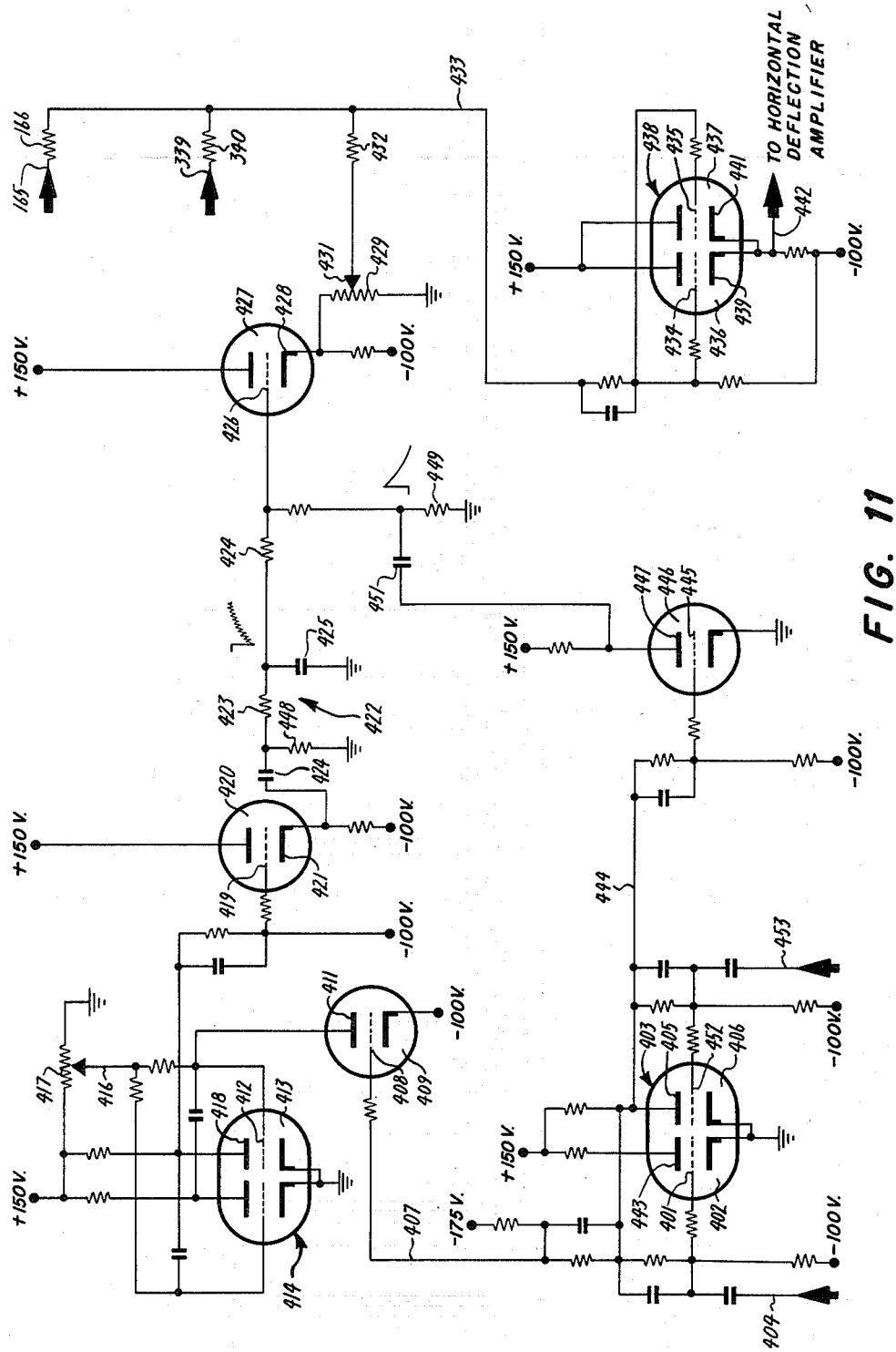

Fig. 11 is a schematic diagram of the horizontal jizzle generator.

Figure 12:
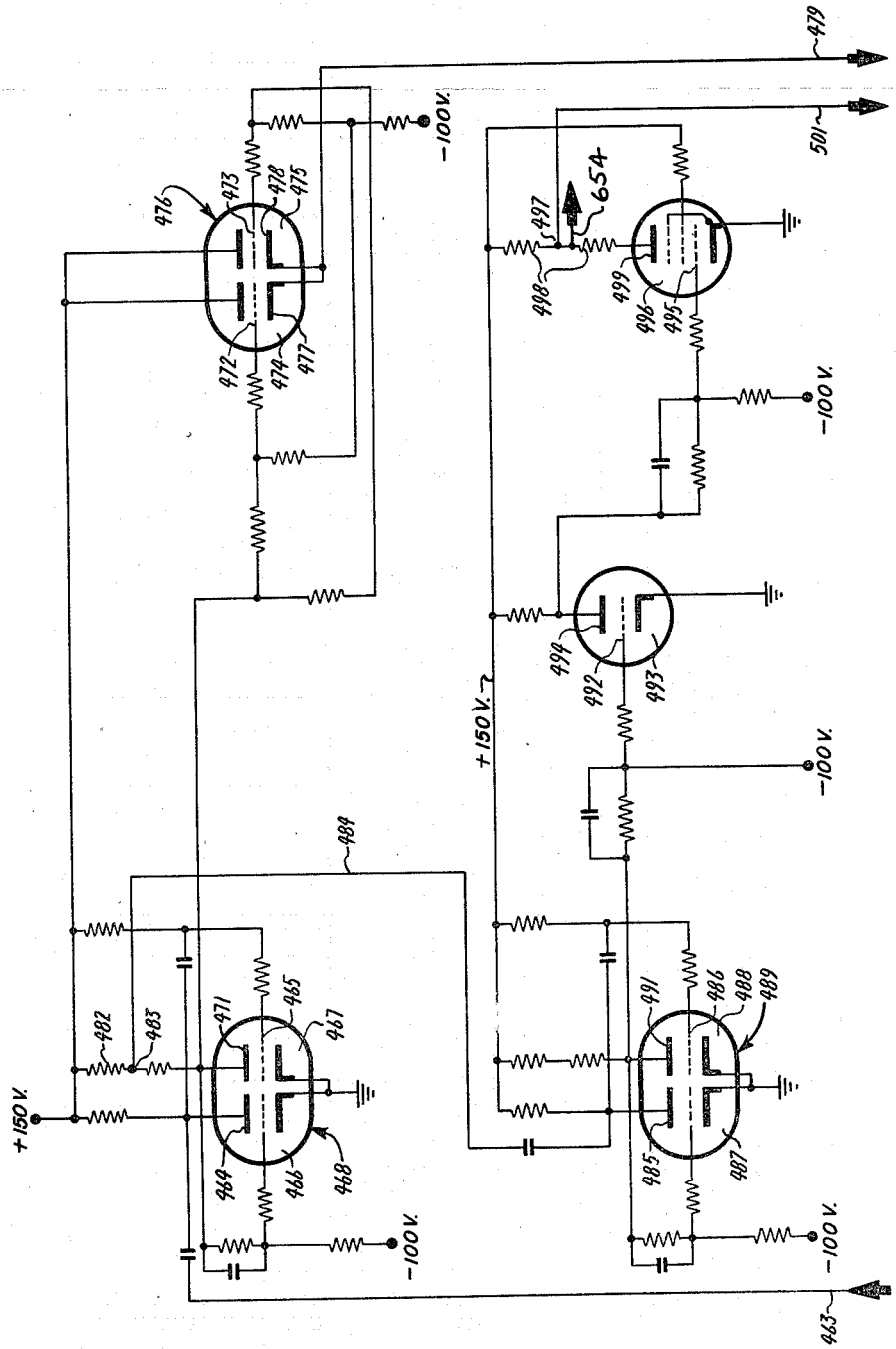

Fig. 12 is a schematic diagram of the print-out delay circuit.

Figure 13:
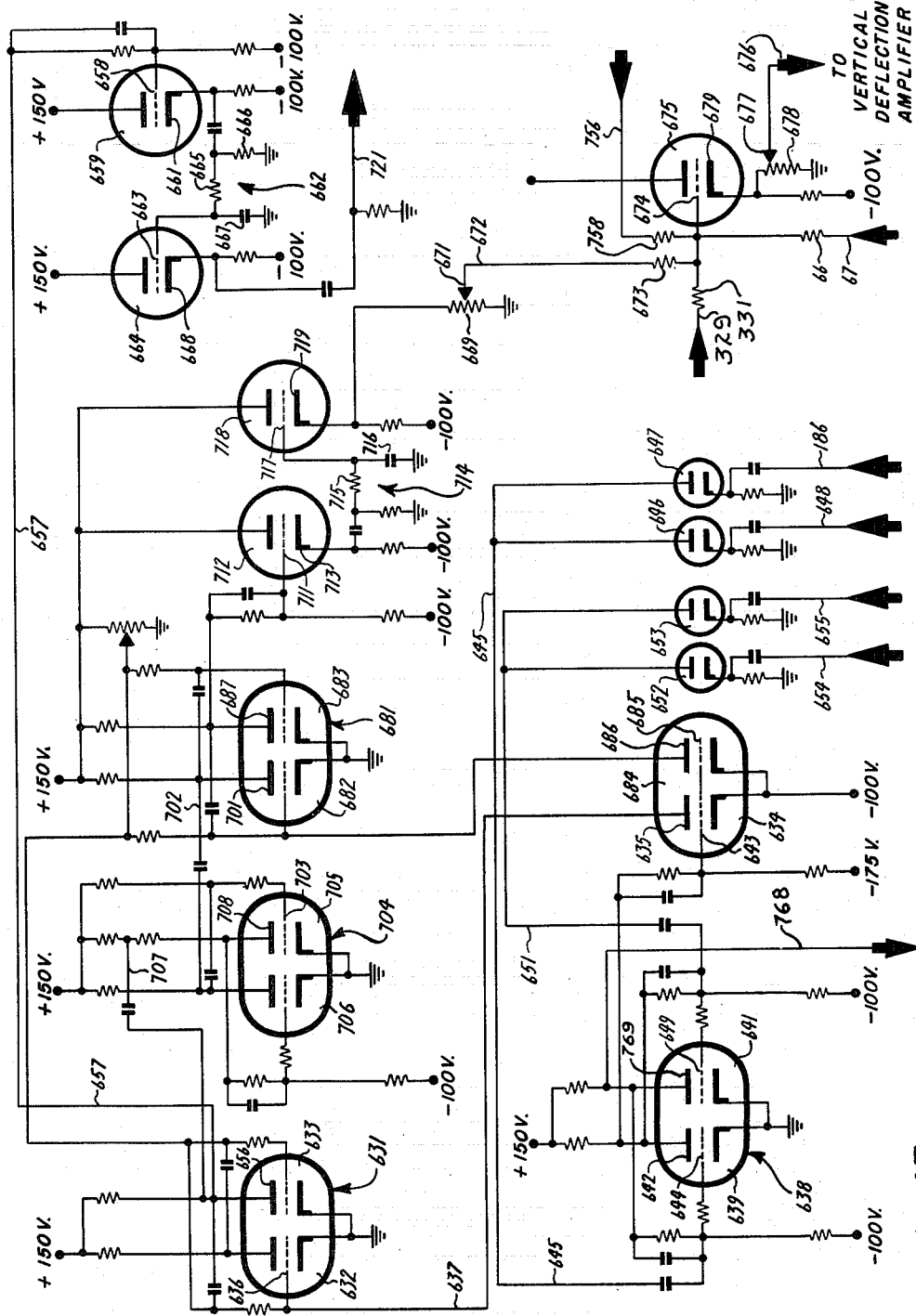

Fig. 13 is a schematic diagram of the vertical jizzle generator.

Fig. 14 is a schematic diagram of the skew corrector circuit.

Fig. 15 is a schematic diagram of the print-out delay matrix.

Fig. 16 shows the relationship of several pulse trains to be described in connection with the skew corrector circuit.

The present invention comprises a flying spot scanning system arranged to read coded information from a document. The information is stored on the document either in the form of small punched holes, in which case the document is read by sensing the light passing through the holes, as illustrated herein, or in the form of printed dots or bars wherein the document is read by sensing the reflected light. In any case, the invention is not directed to the sensing structure and any convenient sensing means may be employed. Generally, the reader of the invention is arranged to search the face of a document to detect the presence and location of information to be read, it being ignorant of both the presence and the location, until the information is located, and for this reason the reader is identified as a "groping" reader.

Referring to Fig. 2, a document 25 capable of being read by the novel reader is illustrated. The code utilized herein to identify characters is contained within two columns (Fig. 3) having a total of four hole positions in each column. The lower left-hand hole 26 in each column set, indicated as position I, is referred to as the "key" hole and is used to signify the presence of a coded character. Six of the remaining seven hole positions, i.e., positions II, III, IV, VI, VII and VIII, provide the bits of a six-bit binary code for character identification, the remaining hole position, position V, being suitable, for example, for providing a self-checking code system, as is well known. A suggested code for utilization herewith is shown in Fig. 4.

It will be noted that to the left of each line of coded information on the document shown in Fig. 2, in the left-hand margin thereof, there is provided a rectangular hole 27, the holes 27 being referred to hereinafter as "start" holes. Each start hole, therefore, signifies the presence of a line of coded characters. A document 25 (Fig. 1) to be read is disposed in any convenient manner between the face of a cathode ray tube 28 and a photocell 29, suitable condensing lenses 31 and 32 being provided between the tube and the document and between the document and the photocell, respectively, and it will be obvious to those familiar with flying spot scanning systems that the cathode ray beam may be controlled to focus the light emanating from the beam on various selected portions of the document. Additionally, it will be observed that, when the spot of light is focused upon a hole in the document, the photocell 29 will provide an indication thereof.

The flying spot scanning system utilized herein is arranged to first scan the document 25 (Fig. 1) to locate a start hole 27 (Fig. 2), the cathode ray beam in the present embodiment being controlled to sweep the left-hand margin of the document from the top thereof toward the bottom until it encounters the first start hole 27a. At this time, means are provided to stop the vertical sweep and, in addition, to initiate a horizontal sweep. The beam is then controlled by the horizontal sweep to move across the document until it locates the first key hole 26. (The path of the cathode ray beam over the document is indicated in phantom lines in Fig. 3.) As noted above, the key hole 26 indicates the presence of a coded character, and it is when the photocell 29 senses a key hole that the horizontal sweep is discontinued and a read cycle is commenced to determine the identity of the coded character associated with the key hole. The structure of the invention is at this time arranged to move the beam sequentially to each of the bit positions, as indicated in Fig. 3, to determine presence or absence of a bit at each bit position and to thereby determine the identity of the character being read.

Upon completion of a read cycle, the horizontal sweep is resumed until the next key hole is encountered, at which time the next character is identified in a similar manner. After a complete line has been read, the beam is returned to the left-hand margin, to the start hole 27a, and the vertical sweep is resumed to search for the next start hole 27b (Fig. 2).

Figure 1:
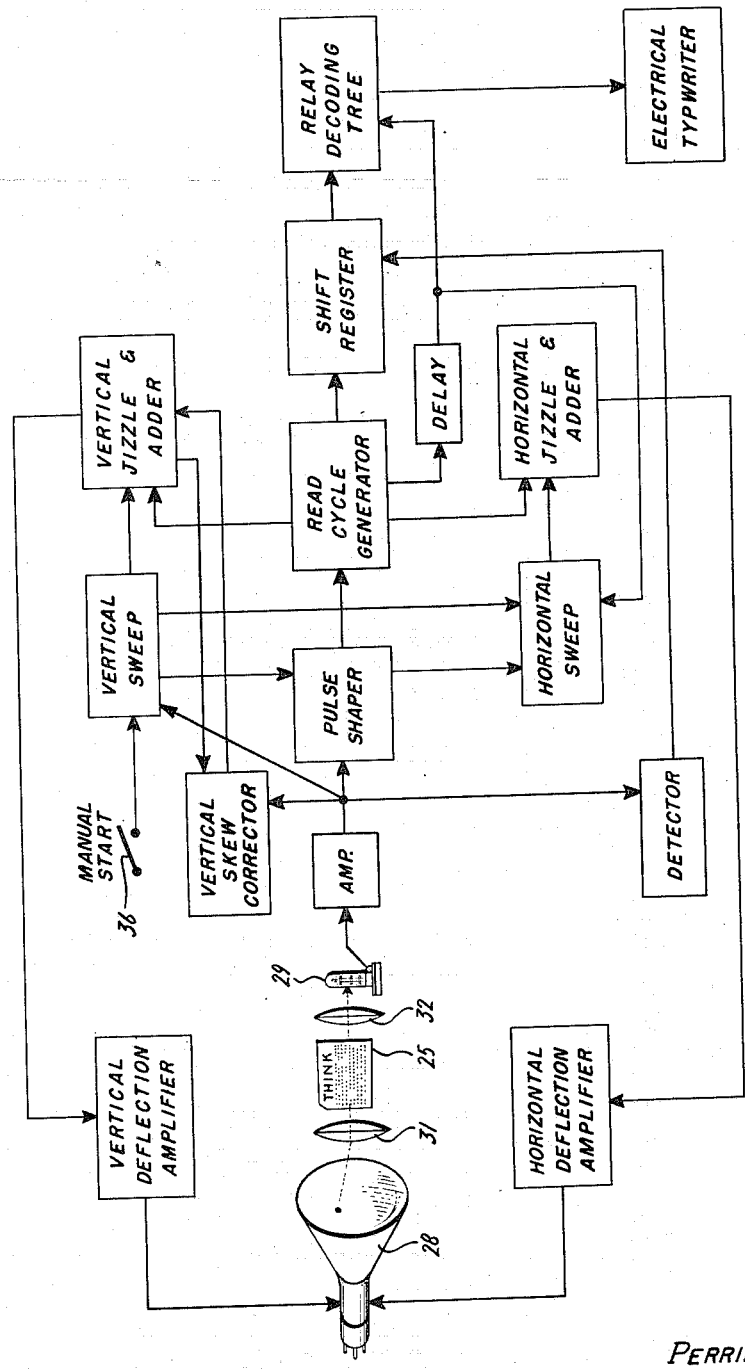
Fig. 1 is a block diagram of the reader of the invention.

Briefly stated and with reference to Fig. 1, this invention provides a flying spot which may be generated by a cathode ray tube 28 and which scans through a data sheet 25 and upon a photocell 29. To initiate a scanning operation, a start switch 36 is closed, whereupon a deflection wave is generated by a vertical sweep circuit, is passed by a vertical jizzle and adder circuit and by a vertical deflection amplifier to an electron beam deflecting means associated with the cathode ray tube 28. The flying spot is thus caused to scan downwardly until it passes through a "start" hole associated with a horizontal line on the data sheet 25 and is sensed by the photocell 29. A voltage thus generated by the photocell 29 is amplified and is impressed upon the vertical sweep circuit to halt the downward scanning of the spot. The voltage is further impressed upon a pulse shaper and thence passes to a horizontal sweep circuit that generates a second deflection wave which is passed by the horizontal jizzle and adder circuit and by the horizontal deflection amplifier to a further deflection means associated with the C.R.T. 28. The spot is thus caused to scan horizontally across the data sheet 25 until a key hole associated with a character is sensed, whereupon a signal from the photocell 29 is amplified and passed by the pulse shaper to a read cycle generator and to the horizontal sweep circuit. A read cycle is thus initiated during which the read cycle generator passes a sequence of signals to the vertical and horizontal jizzle and adder circuits and through the vertical and horizontal deflection amplifiers to move the spot incrementally through a predetermined read pattern for sensing bits which may be detected and passed into a shift register. At the end of the read cycle, the bits recorded in the shift register are passed to a relay decoding tree for determining the character which is thence printed by an electric typewriter. After a delay period to permit printing, the beam will continue the horizontal scanning with interruptions for further read cycles when other key holes are sensed, and at the end of the scanned line, it will retrace to the left and continue the vertical scanning with interruptions for further horizontal scans when other start holes are sensed. A "jizzle" or high frequency oscillation of the flying spot is introduced by the jizzle and adder circuits to effectively broaden the flying spot, thereby minimizing the possibility that a start hole or a key hole will be missed and bypassed as the data sheet 25 is scanned. A vertical skew corrector provides a correction voltage for vertical deflection, the correction voltage being equal to the instantaneous jizzle voltage when a key hole is sensed.

Vertical sweep

The novel reader of the invention is illustrated in block form in Fig. 1, and it will be noted that a manual start key 36 is provided to start the beam groping vertically for start holes 27. Once started, however, the reader continues on its own until the complete document has been read. Although a manual start and a typewriter output have been shown, it will be understood that the invention is not limited thereby and that these have been shown for illustrative purposes only. Actually, the reader is much more suited to some form of electronic print-out since it is extremely fast as compared with the typewriters of today.

The start key 36 (Fig. 5a) is arranged to connect +150 volts to the control grid 37 of a tube 38, the tube 38, a tube 39 and the circuitry associated therewith comprising a Schmitt trigger 35. The tube 38 is normally cut off, the tube 39 being arranged normally to conduct. When, however, the potential of the grid 37 is raised by actuation of the start key 36, the tube 38 is rendered conducting, the tube 39 is cut off, and the plate 40 thereof rises in potential. When the key 36 is reopened, to remove the positive potential from the grid 37 of the tube 38, the plate 40 of the tube 39 drops in potential since that tube again conducts. The plate 40 is coupled through a diode 42 to one control grid 43 of a bistable trigger 44 comprising vacuum tubes 45 and 46. The trigger 44 has two stable conditions, one being when the tube 45 is conducting and the tube 46 is cut off, and the other when the tube 45 is cut off and the tube 46 is conducting. Throughout this description all such bistable triggers will be referred to as "on" when the left-hand tube, as viewed in the drawings, is conducting, and as "off" when the opposite condition exists. In the instant case, the trigger 44 is assumed to be on, initially. When the plate 40 of the tube 39 drops in potential, the resulting negative impulse taken therefrom is applied through the diode 42 to the control grid 43, thereby cutting off the tube 45 and causing the trigger 44 to switch off. At this time the plate potential of the tube 46 drops.

The plate 47 is connected to the control grid 48 of an inverter tube 49, the plate 51 of which is connected by a line 50 to the control grid 52 (Fig. 5b) of a cathode follower 53. When the trigger 44 (Fig. 5a) is on, the inverter is biased to conduct and the cathode of the cathode follower 53 is therefore normally slightly below ground potential. When, however, the plate 47 of the tube 46 drops in potential, due to the trigger 44 being switched off, the inverter tube 49 is cut off and remains cut off until the trigger 44 is again turned on. As soon as the inverter 49 is cut off, its plate 51 rises in potential sufficiently to raise the potential of the cathode of the cathode follower 53 (Fig. 5b) well above ground potential. Thus, it will now be clear that, when the key 36 is depressed and released, the potential of the grid 52, and thus of the cathode 54 of the cathode follower 53, goes up. Additionally, when the trigger 44 is again turned on, thereby rendering the tube 45 conductive and the tube 46 cut off, the cathode 54 of the cathode follower 53 drops back to slightly below ground potential.

One side of a condenser 56 is connected through a diode 57 and a resistor 58 to the cathode 54 of the cathode follower 53, the other side thereof being connected to ground, and it will be noted that, when the cathode 54 is above ground potential, the condenser 56 charges through the diode 57. The non-grounded side of the condenser 56 is additionally connected to the grid 59 of a tube 61, the plate 62 of which is connected to the grid 63 of a cathode follower 64. Connecting the cathode 65 of the cathode follower 64 to one end of a resistor 66 (Fig. 13) is a line 67. The resistor 66 forms a portion of the vertical adder for controlling the potential of the vertical deflection plates of the cathode ray tube. Thus, when the cathode 54 (Fig. 5b) of the cathode follower 53 goes up, the condenser 56 charges, raising the potential of the grid 59 of the tube 61 and lowering the potential of the plate 62 thereof, lowering the potential of the grid 63 and cathode 65 of the cathode follower 64, thereby lowering the potential added into the vertical deflection system through the adding resistor 66 (Fig. 13) and causing the cathode ray beam to sweep downwardly across the document 25. It should now be clear that the vertical sweep circuit moves the cathode ray beam downwardly as long as the trigger 44 (Fig. 5a) is off since, while the trigger 44 is off, the cathode potential of the cathode follower 64 (Fig. 5b) drops exponentially.

Also connected to the non-grounded side of the condenser 56 is the plate 68 of a "dunking" triode 69, the cathode 71 of which is returned by means of a voltage divider to —100 volts and the grid 72 of which is normally biased below cutoff. The dunking tube 69 is provided to return the vertical sweep to its zero position, at the appropriate time, and this is accomplished by driving the grid 72 thereof sharply positive to permit the tube 69 to conduct momentarily and to thereby permit discharge of the condenser 56. It will be recalled that the cathode 71 was returned to —100 volts, and to prevent the condenser 56 from charging negatively, a diode 73 is placed thereacross to prevent the non-grounded side of the condenser 56 from going appreciably below ground potential. When the charge on the condenser 56 reaches a certain, predetermined value, means, to be described, are provided to raise the grid 72 of the dunking tube 69 above cutoff to discharge the condenser 56 and thereby return the cathode ray beam upwardly to its initial position after it has been swept downwardly a predetermined distance, such as to the bottom of a document to be read. This is accomplished in the following manner.

The cathode 74 of the tube 61 is connected through a line 75 to one side of a potentiometer 76, the other side of which is grounded. The arm 77 of the potentiometer 76 is connected to the grid 78 of a tube 79, the tube 79 and a tube 81 being connected as a Schmitt trigger 82. The tube 79 is normally biased below cutoff, since the grid 78 thereof is returned through the line 75 and through the load resistor provided in the cathode circuit of the tube 61 to —100 volts, and the tube 81 is therefore normally conducting. When, however, the grid 78 of the tube 79 is raised in potential sufficiently to permit the tube 79 to conduct, the opposite condition results and, as is usual with Schmitt triggers, this condition is sustained as long as the potential of the grid 78 remains above cutoff. As the charge across the condenser 56 increases, the cathode 74 of the tube 61 rises accordingly to thereby raise the potential on the grid 78 of the tube 79. When the potential on the grid 78 is raised sufficiently, the Schmitt trigger 82 fires, and the plate 83 of the tube 81 rises in potential. It should be noted that the charge on the condenser 56 necessary to fire the Schmitt trigger 82 may be controlled by adjustment of the potentiometer 76. Decreasing the resistance between the grid 78 of the tube 79 and the cathode 74 of the tube 61 lowers the voltage across the condenser 56 necessary to fire the Schmitt trigger.

The plate 83 of the tube 81 is coupled to the control grid 84 of an inverter tube 85, the plate 86 of which is connected through a line 87 to the plate 88 of a tube 89 which forms a portion of a single shot multivibrator 91. Additionally, it will be noted, the plate 88 is coupled to the control grid 92 of a tube 93 which forms the other portion of the multivibrator 91. The tube 85 is normally cut off; however, when the Schmitt trigger 82 fires, the grid 84 of the tube 85 is driven above cutoff, thus lowering the plate potential thereof. The tube 89 of the multivibrator 91 is normally biased below cutoff, the tube 93 thereof being arranged normally to conduct, and when the plate 86 of the tube 85 drops in potential, the resulting negative impulse applied to the grid 92 of the tube 93 is sufficient to trigger the multivibrator. The resulting timed, negative-going pulse taken from the plate 88 of the tube 89 is fed to the grid 94 of an amplifier 95 through a line 96. The plate 97 of the amplifier 95 is connected through a line 98 to the grid 72 of the dunking tube 69. Thus, when the charge across the condenser 56 reaches a value determined by the setting of the potentiometer 76, the Schmitt trigger 82 fires, the dunking tube 69 conducts momentarily, and the condenser 56 is discharged.

Thus far, the initiation of the vertical sweep by the actuation of the start key 36 has been described. It will be recalled that it is desired to stop the vertical sweep as soon as a start hole 27 is encountered by the cathode ray beam. Referring now to Fig. 6, the output of the photocell is coupled through a line 100 to the grid 101 of an amplifier tube 102 which is arranged to drive a cathode follower 104. When the cathode ray beam strikes a start hole, and thereby energizes the photocell, a negative impulse is created which is amplified and inverted by the tube 102 and which is taken from the cathode 105 of the cathode follower 104 as a positive pulse. The cathode 105 is connected through a line 106 and through a diode 107 (Fig. 5a) to the control grid 108 of a cathode follower 109. The diode 107 and a diode 111 comprise an "and" gate 110, and it will be understood that a positive impulse taken from the cathode 105 (Fig. 6) of the tube 104 will not pass through the diode 107 to the grid 108 (Fig. 5a) of the tube 109 unless the cathode of the diode 111 is up. The potential of the cathode of the diode 111 is determined by the potential of the cathode 112 of a cathode follower 113, the control grid 114 of which is normally at a low potential. The cathode of the diode 111 is, therefore, normally low, thereby maintaining the gate 110 closed.

It will be recalled that, when the start key 36 is actuated, the trigger 44 is turned off and the plate 47 of the tube 46 drops in potential. The resulting negative impulse taken from the plate 47 is coupled through a line 115 to the control grid 116 of a single shot multivibrator 117 comprising vacuum tubes 118 and 119. The tube 118 is normally conducting, the tube 119 being normally cut off. When the plate 47 of the trigger tube 46 drops in potential, however, the tube 118 is cut off momentarily and the plate 121 thereof rises in potential for a short period of time. As soon as the plate 121 again drops, at the end of the period of the multivibrator, the resulting negative impulse turns off a bistable trigger 122 which is assumed normally to be on. The trigger 122 comprises vacuum tubes 123 and 124. As noted above, the negative impulse taken from the plate 121 of the tube 118 reverses the condition of stability of the trigger 122 and causes the plate 125 of the tube 123 to go up. The plate 125 is connected through a line 126 to the control grid 114 of the cathode follower 113, and it will now be understood that, when the vertical sweep is initiated by actuation of the start key 36, and after a short period of time determined by the time constant of the single shot multivibrator 117, the "and" gate 110 is opened, since the gate 110 is opened by the trailing, negative-going edge of the pulse generated by the multivibrator 117. The purpose of the delay provided by the single shot multivibrator 117 in opening the gate 110 will be more fully explained hereinafter.

It will now be assumed that the start key 36 has been actuated and released and that the "and" gate 110 has been opened, and that the cathode ray beam is sweeping downwardly in the left-hand margin of the document 25 in search of the first start hole 27a. As soon as the beam encounters the start hole 27a, the signal received from the photocell passes through the gate 110 and raises the grid potential of cathode follower 109, thus raising the potential of the cathode 128 thereof. The cathode 128 is connected to the control grid 129 of one tube 131 of a Schmitt trigger 132. The tube 131 is normally nonconducting since the grid 129 thereof is returned through the load resistor of the tube 109 to —100 volts; however, the application of a positive impulse to the control grid 129, sufficient to overcome the bias thereon, renders that tube conductive for the duration of the impulse and thereby lowers the plate potential thereof. An integrating network 130 comprises a condenser 133 and a resistor 134 is provided in the grid circuit of the tube 131 to supply a short delay to permit the cathode ray beam to reach the center of the start hole before being stopped by operation of the Schmitt trigger 132. Additionally, the integrating network 130 helps the system to distinguish between noise and actual signals in that the threshold firing voltage of the Schmitt trigger is attained across the condenser 133 only if an actual, strong signal is received from the photocell, as opposed to ordinary noise signals.

The plate 135 of the tube 131 is connected to each of the grids 136 and 137 of the triggers 122 and 44, respectively, through a line 138. When the Schmitt trigger 132 fires, and it should now be clear that it does shortly after the cathode ray beam encounters a start hole, the negative impulse taken from the plate 135 thereof switches each of the triggers 44 and 122 on. When the trigger 44 is switched on, the potential of the plate 47 thereof is raised, and it will be noted that as a result thereof the cathode 54 (Fig. 5b) of the cathode follower 53 drops to ground potential, thereby preventing the further charging of the condenses 56 and halting the vertical sweep. When the trigger 122 is switched on, the plate 125 of the tube 123 drops in potential, causing the cathode 112 of the cathode follower 113 to drop, and thereby closing the "and" gate 110 to prevent the passage of further pulses from the photocell. In review, it will now be understood that, when the sweep is initiated, the "and" gate is opened, after a short delay, to permit passage of "start" pulses from the photocell, and that as soon as a start pulse is received, the vertical sweep is stopped and the "and" gate is closed to prevent the passage of further start pulses.

*Horizontal sweep*

It will be recalled that, when a start hole is encountered by the cathode ray beam, it is desired to initiate the horizontal sweep, in addition to stopping the vertical sweep. The plate 135 (Fig. 5a) of the tube 131 of the Schmitt trigger 132 is connected through a line 142 to the plate of a diode 143 (Fig. 7), the cathode 144 of which is coupled to the control grid 145 of a tube 146. The diode 143 and a diode 147 comprise an "or" gate 148, and the tube 146 and a tube 149 comprise a bistable trigger 151, which trigger is normally on. It will be understood that a negative impulse applied to the plate of either of the diodes 143 or 147 switches the trigger 151 off, and when the Schmitt trigger 132 fires, as it does when a start hole is encountered by the cathode ray beam, the potential of the plate of the diode 143 drops and the trigger 151 is turned off. The plate 152 of the tube 149 is normally at a high potential due to that tube normally being cut off; however, when the trigger 151 is turned off, the plate 152 drops in potential, as does the grid 153 of a power tube 154 connected thereto.

The plate 155 of the power tube 154 is suitably coupled through a condenser 156, a resistor 157, and a diode 158 to one side of a condenser 159, the other side of which is grounded. The voltage across the condenser 159 controls the horizontal sweep voltage in much the same manner that the voltage across the condenser 56 (Fig. 5b) controls the vertical sweep voltage. When the plate 155 (Fig. 7) is high, i.e., when the trigger 151 is off, the condenser 159 charges; however, when the trigger 151 is on, no charging of the condenser 159 results, and it will be understood that the horizontal sweep is stopped and started by controlling the condition of stability of the trigger 151. The non-grounded side of the condenser 159 is connected through a line 161 to the control grid 162 of a cathode follower 163, and, as the potential across the condenser 159 increases, the potential of the cathode 164 of the cathode follower 163 likewise increases. The cathode 164 is connected through a line 165 to one side of a resistor 166 (Fig. 11), which resistor forms a portion of the resistor network which comprises the horizontal adder for controlling the potential of the horizontal deflection plates of the cathode ray tube.

Also connected to the line 161 (Fig. 7) is the plate 167 of a dunking tube 168, which tube is provided to discharge the condenser 159 at the proper time, as will become apparent, to return the horizontal sweep to the leftmost or zero position. The cathode 164 of the cathode follower 163 is connected through a line 169 and through a potentiometer 170 to ground, and the arm 171 of the potentiometer 170 is connected to the grid 172 of a Schmitt trigger 173. The Schmitt trigger 173 is comprised of tubes 174 and 175, and the potential of the cathode 164 of the cathode follower 163 is normally sufficiently low to maintain the tube 174 of the Schmitt trigger 173 cut off. When the charge across the condenser 159 increases sufficiently to render the tube 174 conductive, the Schmitt trigger fires. The resulting rise in potential of the plate 176 of the tube 175 is amplified and inverted by a tube 177 and is coupled to the plate 178 and the control grid 179 of tubes 181 and 182, respectively, which comprise a single shot multivibrator 183. As described above in connection with the vertical dunking mechanism, the resulting negative pulse taken from the plate 178 of the tube 181 is applied to the control grid 184 of a power tube 185 where it is inverted and amplified and is applied through a line 186 to the control grid 188 of the dunking tube 168. Thus, when the condenser 159 is charged to a potential measured by the setting of the potentiometer 170, the Schmitt trigger 173 fires, thereby causing the single shot multivibrator 183 to create a short dunking pulse, which pulse momentarily removes the cutoff bias on the grid 188 of the dunking tube 168, thereby permitting that tube to conduct to discharge the condenser 159, returning the horizontal sweep to its zero position. A clamping diode 189 is provided across the condenser 159 to prevent the line 161 from going appreciably below ground potential.

It should also be noted in this connection that the plate 187 of the power tube 185 is also connected to the control grid of a tube 245 which is connected in parallel with a tube 244 as an inverter 243. The tap 246a, provided in the load resistor 246 of the inverter 243, is coupled to the control grid 248 of the trigger 151. Thus, when the Schmitt trigger 173 fires, the plate 187 of the tube 185 goes up, the plate 247 of the inverter 243 goes down, and the trigger 151 is turned on, thereby stopping the horizontal sweep when the cathode ray beam is returned to the left after having scanned a line of characters.

*Pulse shaper*

It will now be understood that, when a start hole is encountered by the cathode ray beam, the resulting negative pulse taken from the line 142 (Fig. 5a) starts the horizontal sweep, and it will be recalled that it is desired that the horizontal sweep be continued until the beam strikes a key hole 26. It is one function of the pulse shaper structure to provide a pulse to stop the horizontal sweep when the beam encounters a key hole. The cathode 105 (Fig. 6) of the cathode follower 104 is connected through a line 189 and a resistor 191 to the cathode of a diode 192. The diode 192 and a diode 193 comprise an "and" gate 194, and it will be seen that pulses from the photocell will pass through the diode 192 to the control grid of a cathode follower 196 only if the cathode of the diode 193 is high. The potential of the cathode of the diode 193 is controlled by the cathode potential of a cathode follower 197 which is arranged to follow the potential of the plates 198 and 199 of two inverter tubes 201 and 202, respectively. The potential of two lines 203 and 204 directly controls the plate potentials of the tubes 201 and 202, respectively, and thereby controls the potential of the cathode of the diode 193. When either of the lines 203 or 204 is low, thus lowering the potential of the associated control grid, the cathode of the diode 193 is high, and the gate 194 is open.

The line 203 is connected to the plate 205 (Fig. 5b) of one tube 206 of a bistable trigger 207. The trigger 207 is normally on and the plate 205 of the tube 206 is, therefore, normally high. The control grid 209 of one tube 210 of a single shot multivibrator 211 is coupled to the plate 135 (Fig. 5a) of the tube 131 through a line 131a. The tube 210 is normally conducting, the other tube 212 of the single short 211 being normally cut off. However, when the plate 135 of the tube 131 goes down, as it does when a start hole is encountered by the vertical sweep, the resulting negative impulse is applied to the control grid 209 of the tube 210 and a timed, positive pulse is taken from the plate 213 of the tube 210 and is applied through a line 214 to the control grid 215 of the bistable trigger 207, the trailing, negative-going edge of the positive pulse taken from the plate 213 being arranged to turn the trigger 207 off. Thus, after the vertical sweep encounters a start hole and after a short delay determined by the time constant of the single shot multivibrator 211, the potential of the line 203 drops, since the tube 206 then commences to conduct, and the gate 194 (Fig. 6) is opened. The reason for the provision of the delay provided by the single shot multivibrator 211 will be explained hereinafter in connection with the overall description of operation of the invention.

It will now be understood that, when the horizontal sweep encounters a key hole, the pulse from the photocell passes through the gate 194 (Fig. 6) and appears on the grid 195 of the cathode follower 196, thus raising the potential of the cathode 217 thereof. The cathode 217 is coupled to the grid 218 of a tube 219 which is normally cut off, the tube 219 and a tube 221 comprising a Schmitt trigger 222. The grid 218 is also connected through a resistor 223 to the arm 224 of a potentiometer 225, one side of which is grounded, the other side being connected through a series resistor 226 to −100 volts, and it should be clear that the threshold firing voltage of the Schmitt trigger 222 is controlled by adjustment of the potentiometer 225.

When the cathode 217 of the cathode follower 196 goes up, due to the cathode ray beam striking the key hole, the grid 218 of the tube 219 is driven positive. (It will be understood that the setting of the potentiometer 225 determines the signal amplitude necessary to fire the Schmitt trigger 222 and, by proper adjustment, the potentiometer may be set to prevent ordinary noise signals from firing the Schmitt trigger.) When the Schmitt trigger 222 fires, the plate 228 of the tube 219 drops in potential and thus raises the potential of the plate 229 of a power tube 231, the grid 232 of which is connected to the plate 228 by a line 233. It will be noted that the plate 229 is connected through a line 234 to the control grid 235 of a power tube 236 and that when the Schmitt trigger 222 fires the plate 237 of the tube 236 is driven negative. The tap 238 of the load resistor 239 connected to the plate 229 of the power tube 231 is connected through a line 241 to the control grid 242 (Fig. 7) of the inverter 243. It will be recalled that, while the condenser 259 is charging, the trigger 151 is off and, when a positive-going pulse applied to the grid 242 of the inverter 243 is inverted and applied to the grid 248 of the trigger 151, the trigger 151 is turned on and the horizontal sweep is halted due to the plate 155 of the tube 154 being lowered in potential. Thus far, the horizontal sweep has located a key hole and has stopped the beam thereon, and it is at this time that a read cycle is commenced to determine the identity of the character indicated by the key hole.

*Read cycle generator*

It has been shown that, when the cathode ray beam encounters a key hole, the horizontal sweep is discontinued, and it is at this time that the read cycle is initiated to move the beam sequentially to each of the bit positions shown in Fig. 3. The tape 237a (Fig. 6) of the load resistor in the plate circuit of the tube 236 is coupled through a line 251 to the control grid 252 (Fig. 9a) of a tube 253, the tube 253, a tube 254 and the circuitry associated therewith comprising a single shot multivibrator 255. The tube 253 is normally conducting, the tube 254 being normally cut off, and it will be understood that a negative-going pulse on the line 251 will trigger the multivibrator 255 to emit a single, timed pulse which is taken from the plate 256 of the tube 253 as a positive pulse. Thus, when the plate 237 (Fig. 6) drops in potential, as it does when a key hole is sighted by the cathode ray beam, the multivibrator 255 is triggered.

A line 257 is provided to couple the plate 256 to the grid 258 of a tube 259. The tube 259 and a tube 261 form a bistable trigger 262, and it will be assumed that the trigger 262 is normally on, i.e., that the plate 263 thereof is normally high. When the grid 258 is lowered below cutoff, however, by the trailing, negative-going edge of the positive pulse taken from the plate 256, the opposite condition results and the plate 263 of the tube 261 drops in potential. The plate 263 is suitably connected to the grid 264 of a triode 265, the cathode of which is returned to −100 volts. When the plate 263 of the trigger 262 is high, the triode 265 is permitted to conduct and the plate thereof is at some negative potential. When, however, the trigger 262 is turned off, the plate 263 drops in potential and the tube 265 is cut off, thus raising the potential of its plate 266. The plate 266 of the tube 265 is connected to the grid 267 of a free-running multivibrator 268, which multivibrator is prevented from oscillating as long as the tube 265 is conducting, since the grid 267 thereof during this time is biased below cutoff. When the tube 265 is cut off, however, the grid 267 is raised in potential sufficiently to permit oscillation of the multivibrator 268, the frequency of which may be adjustably determined by the setting of the arm 269 of a potentiometer 270 provided in the grid circuits of each of the tubes 271 and 272 of the multivibrator 268.

When the beam registers on a key hole, therefore, the horizontal sweep is stopped, and, after a short delay provided by the single shot multivibrator 255, the trigger 262 is turned off and the free-running multivibrator 268 is permitted to commence oscillating. Additionally, it will be understood that the multivibrator 268 continues to oscillate as long as the trigger 262 is off. When, however, the trigger 262 is turned on, the multivibrator 268 ceases oscillating.

The grid 273 of a power tube 274 is connected to the plate 275 of the multivibrator tube 271, and the pulses taken therefrom when the multivibrator 268 is oscillating are amplified and are applied through a line 276 to each of the control grids 277 and 278 (Fig. 9b) of the tubes 279 and 281 of a bistable trigger 282 which is the first stage of a three-stage binary counter. The trigger 282 is normally on, and it will be understood that the negative-going, trailing edge of each read cycle pulse generated by the multivibrator 268 and taken from the plate 283 of the power tube 274 reverses the condition of stability of the trigger 282. The trailing edge of the first pulse generated by the multivibrator 268 turns the trigger 282 off and thus raises the potential of the plate 284 thereof, the trailing edge of the next read cycle pulse turns the trigger 282 on to thereby again lower the potential of the plate 284, etc.

The plate 284 is connected through a line 285 to the control grid 286 of a cathode follower 287, the cathode 288 thereof being coupled through a line 289 to the grids 291 and 292 of tubes 293 and 294, respectively, which comprise another bistable trigger 295. The trigger 295 is the second stage of the aforementioned three-stage binary counter and, as in the case of the trigger 282, it is normally on, the plate 296 thereof being normally at a low potential. When the trigger 282 is turned on, the potential of the cathode 288 of the cathode follower 287 drops and a negative impulse is applied through the line 289 to each of the control grids 291 and 292 of the trigger 295 which is sufficient to turn the trigger 295 off, thereby raising the potential of the plate 296 thereof. The plate 296 is connected through a line 297 to the control grid 298 of a cathode follower 299, the cathode 301 of the cathode follower 299 being connected through a line 302 to each of the control grids 303 and 304 of vacuum tubes 305 and 306, respectively, which comprise a bistable trigger 307. The trigger 307 forms the third stage of the binary counter and is normally on. Each time the cathode 301 of the cathode follower 299 drops in potential, as it does when the trigger 295 is turned on, the trigger 307 is turned off.

As noted above, the triggers 282, 295 and 307 comprise a three-stage binary counter, and all three are normally on. The trailing edge of the first pulse generated by the multivibrator 268 turns off the trigger 282; the trailing edge of the second read cycle pulse turns off the trigger 295; and the trailing edge of the fourth read cycle pulse turns off the trigger 307. Therefore, when the first pulse is generated by the multivibrator 268, the plate 284 of the tube 279 is raised in potential; the second pulse lowers the plate 284 and raises the plate 296 of the tube 293; the third pulse again raises the plate 284 of the tube 279; the fourth pulse lowers the plate 284 of the tube 279, lowers the plate 296 of the tube 293, and raises the plate 308 of the tube 305; the fifth pulse raises the plate 284 of the tube 279; the sixth pulse lowers the plate 284 of the tube 279 and raises the plate 296 of the tube 293; the seventh pulse raises the plate 284 of the tube 279 (at this time it should be noted that all three plates 284, 296 and 308 are high); and the eighth pulse causes all three of the plates 284, 296 and 308 to drop, since at this time all three triggers are turned on.

The read cycle illustrated in Fig. 3 necessitates the addition of small voltage increments to the vertical deflection plates of the cathode ray tube to thereby raise the beam to the various bit positions in each bit column. Additionally, a small horizontal voltage increment must be added to the horizontal deflection plates to shift the beam from the first bit column to the second bit column. In the present embodiment, three successive vertical increments are provided to move the beam sequentially from the key hole to each of positions II, III and IV in the first bit column. Next, these vertical increments are taken away and a small horizontal increment is added to position the beam on the lower position, position V, in the second bit column. The three vertical increments are again successively added to move the beam to positions VI, VII and VIII and, finally, these last three vertical increments and the horizontal increment are removed to return the beam to the key hole. This completes one read cycle.

The vertical increments are provided by a vertical increment voltage network 309 (Fig. 9c) which comprises resistors 311, 312, 313 and 314. The resistors 311 and 312 are connected to the cathodes 288 (Fig. 9b) and 301 of the cathode followers 287 and 299, respectively, by the lines 289 and 302, and the resistors 313 (Fig. 9c) and 314 are each connected to each of the control grids 315 and 316 of tubes 317 and 318 which are connected in parallel as a cathode follower 320. The lines 319 and 321 intermediately of the resistors 311, 313 and 312, 314, respectively, are clamped to ground by diodes 322 and 323, respectively. Also connected to the lines 319 and 321 are the plates of two diodes 324 and 325, respectively, the cathodes of which are joined together and are connected to the arm 326 of a potentiometer 327. One side of the potentiometer 327 is grounded, the other side thereof being connected through a resistor 328 to a low impedance, +150-volt supply, and it will be understood that the potential of the cathodes of the diodes 324 and 325 is controlled by means of the potentiometer 327.

The resistance of the resistors 311 through 314 is high as compared with the resistance of the diodes 324 and 325, and, additionally, the resistor 313 has twice the resistance of the resistor 314. Assuming the potential of the arm 326 to be a voltage E, it will be seen that, when the cathode 301 (Fig. 9b) of the cathode follower 299 is low, i.e., below ground, and the cathode 288 of the cathode follower 287 is high, the line 321 (Fig. 9c) is clamped to ground by the diode 323 and the line 319 is clamped to the potential E by the diode 324. Under these conditions it will be seen that the control grids 315 and 316 of the tubes 317 and 318 are maintained at a potential equal to ⅓ E, due to the voltage dividing network comprising resistors 313 and 314.

When the cathode 301 (Fig. 9b) is high and the cathode 288 is low, the line 319 (Fig. 9c) is at ground potential and the line 321 is at the potential E, and under these conditions the grids 315 and 316 are raised to a potential equal to ⅔ E. Finally, when both cathodes 301 (Fig. 9b) and 288 are high, each of the lines 319 (Fig. 9c) and 321 is at the potential E and the grids 315 and 316 are likewise at potential E. The cathodes of the cathode follower 320 are joined together and are connected through a line 329 to one side of a resistor 331 (Fig. 8) which forms a part of the aforementioned vertical adding network.

It will be recalled that the pulses generated by the multivibrator 268 (Fig. 9a) are entered into the three-stage counter and that the first pulse so generated causes the potential of the plate 284 (Fig. 9b) of the tube 279 to rise, thus raising the potential of the cathode 288 of the cathode follower 287 coupled thereto. Also, at this time the plate 296 of the tube 293 is at a low potential since the trigger 295 is on, thus maintaining the cathode 301 of the cathode follower 299 low. Under these conditions, as noted above, a potential equal to ⅓ E is applied to the control grids 315 (Fig. 9c) and 316 of the cathode follower tubes 317 and 318 and a corresponding voltage taken from the cathodes thereof is added to the vertical deflection system. In this way, the first read cycle pulse controls the vertical sweep circuit to position the cathode ray beam on position II, i.e., the first bit position. (It will be noted that the value of E, and thus the degree of deflection of the beam vertically, is controlled by adjustment of the potentiometer 327.)

The second pulse generated by the multivibrator 268 (Fig. 9a) turns the trigger 282 (Fig. 9b) on and also turns the trigger 295 off, thus lowering the potential of the plate 284 of the trigger 282 and raising the potential of the plate 296 of the trigger 295. When the plate 284 drops in potential, the potential of the line 289 connected to the cathode 288 of the cathode follower 287 also drops, and when the potential on the plate 296 rises, the potential of the line 302 connected to the cathode 301 of the cathode follower 299 also rises. Under these conditions it will be recalled that a potential corresponding to ⅔ E is added to the vertical deflection voltage. Thus, the vertical sweep circuits are controlled by the trailing edge of the second read cycle pulse to position the cathode ray beam on position III, i.e., the second bit position. After the third read cycle pulse, both of the lines 289 and 302 are high, since each of the triggers 282 and 295 are off, and a potential corresponding to E is added to the vertical deflection voltage to thereby position the cathode ray beam on position IV, i.e., the third bit position. The fourth read cycle pulse emitted by the multivibrator 268 turns both of the triggers 282 and 295 on and at this time the voltage previously added to the vertical sweep circuit is removed, since both of the lines 289 and 302 are at a low potential. In a manner similar to that described above, it will be seen that the fifth read cycle pulse provides a vertical deflection corresponding to ⅓ E, the sixth read cycle pulse provides a vertical deflection corresponding to ⅔ E, the seventh read cycle pulse provides a vertical deflection corresponding to E, and the eighth read cycle pulse erases the vertical increments.

The small horizontal voltage increment necessary to shift the cathode ray beam from the first bit column to the second bit column when the fourth read cycle pulse is generated is provided by the potential of the arm 335 (Fig. 9c) of a potentiometer 336 which is connected between ground and the cathode 337 (Fig. 9b) of a cathode follower 338. The potential of the cathode 337 is controlled by the plate potential of the tube 305 of the trigger 307, and it will be noted that, when the trigger 307 is turned off by the fourth read cycle, the plate 308 thereof rises in potential, thus raising the potential of the cathode 337 of the cathode follower 338 and, since the arm 335 (Fig. 9c) of the potentiometer 336 is connected through a line 339 to one side of a resistor 340 (Fig. 11), which resistor forms a portion of the horizontal voltage adder, it will be understood that at this time the horizontal sweep is shifted to position the beam on the fourth bit position. (It should be noted that the amount of shift is controlled by suitable adjustment of the potentiometer 336 (Fig. 9c).) When the trigger 307 is again turned on, by the eighth read cycle pulse, it will be clear that the horizontal shift voltage is removed from the horizontal adder.

Thus, it will now be understood that the first read cycle pulse generated by the multivibrator 268 moves the beam from the key hole upwardly to position II, that the second read cycle pulse moves the beam upwardly to position III, that the third pulse moves the beam upwardly to position IV, that the fourth pulse moves the beam downwardly and horizontally to the right to position V, that the fifth pulse moves the beam upwardly to position VI, that the sixth pulse moves the beam upwardly to position VII, that the seventh pulse moves the beam upwardly to position VIII, and that the eighth read cycle pulse returns the beam to the key hole.

In addition to being connected to the potentiometer 336, the cathode 337 (Fig. 9b) is connected to the control grid 341 (Fig. 9a) of the trigger 262 by a line 540. It will be understood that the condition of stability of the trigger 262 is reversed by the application to the proper grid thereof of a negative-going impulse and, when the third stage 307 of the binary counter is turned on by the eighth read cycle pulse, the potential of the cathode 337 (Fig. 9b) of the cathode follower 338 drops, the resulting negative-going impulse being arranged to turn the trigger 262 (Fig. 9a) on, thereby stopping the oscillation of the multivibrator 268. In this way, the multivibrator 268 is turned off after eight read cycle pulses have been generated thereby.

Detector

The positioning of the cathode ray beam sequentially on each bit position was explained above, and it is the function of the detector to determine the presence or absence of a bit at each such position. Amplified signals from the photocell are taken from the cathode 105 (Fig. 6) of the cathode follower 104, through a line 342, and are applied to the cathode 343 (Fig. 10) of a diode 344. The diode 344 and a diode 345 comprise an "and" gate 346, and if the cathode 347 of the diode 345 is high, it will be seen that the positive photocell signals pass through the diode 344 and appear on the control grid 348 of a cathode follower 349.

The potential of the cathode 347 of the diode 345 is controlled by the potential of the cathode 351 of a cathode follower 352, the cathode 347 being suitably connected to the cathode 351. The grid 353 of the cathode follower 352 is connected to the plate 354 of a power tube 355, the potential of which is controlled by the potential of the plate 356 of one tube 357 of a trigger 358. The trigger 358 includes the tube 357 and a tube 359, and when it is on, i.e., when the tube 359 thereof is conducting, the grid 361 of the power tube 355 is high, the plate 354 of the tube 355 is low, and the cathode 347 of the diode 345 is likewise low. However, when the trigger 358 is turned off, the opposite condition results and the cathode 347 of the diode 345 is high, thus opening the "and" gate 346 to permit the passage of signals from the photocell. The trigger 358 is turned off, thus opening the gate 346, by negative-going pulses taken from the tap 237a (Fig. 6) in the load resistor of the power tube 236, the grid 359a (Fig. 10) of the tube 359 being connected by a line 360 to the tap 237a (Fig. 6). It will be recalled that the potential of the plate 237 of the tube 236 is arranged to drop when the cathode ray beam strikes a key hole, and it is at this time that the trigger 358 is turned off, thereby opening the gate 346.

The cathode ray beam, it will be recalled, is moved from the key hole to position II. If there is a bit in the form of a hole at this position, a signal from the photocell appears on the control grid 348 of the cathode follower 349. Such signals are positive in form and it will be understood that, when a photocell signal is applied to the grid 348 of the cathode follower 349, the potential of the cathode 362 thereof rises. The cathode 362 is coupled through a line 363 and a resistor 364 to the plate 365 of a diode 366, the line 363 being clamped to ground potential by a diode 367. The cathode 368 of the diode 366 rises in potential with the plate 365 thereof, and when the cathode 362 of the cathode follower 349 goes up, the potential of the cathode 368 follows it. The cathode 368 is connected to the control grid 369 of a cathode follower 371, the cathode 372 of which is coupled to the control grid 373 of one tube 374 of a Schmitt trigger 375.

As will become clear and for a purpose to be more fully explained hereinafter, a small high frequency voltage, referred to later herein as the horizontal jizzle voltage, is added to the horizontal deflection plates while the beam is sweeping through a read cycle. This causes the beam to move rapidly back and forth across each bit position and if a bit is present at the bit position then being inspected, several signals from the photocell are created. Thus, when a bit is present at a given bit position, the several signals from the photocell are transmitted through the diode 344 and the cathode follower 349 to the control grid 369 of the cathode follower 371. A condenser 376 is connected to the cathode 368 of the diode 366, and each time the beam sweeps across a bit hole, the charge on the condenser 376 is increased. As the condenser 376 charges, the potential on the grid 369, and thus the cathode 372 of the cathode follower 371, is increased. The tube 374 of the Schmitt trigger 375 is normally non-conducting, the tube 377 thereof being arranged normally to conduct, and when the potential of the grid 373 thereof is raised above its threshold value, the Schmitt trigger 375 fires and the resultant, positive-going pulse taken from the plate 378 of the tube 377 is applied to the control grid 379 of a single shot multivibrator 381. It should be noted that the value of the threshold firing voltage of the Schmitt trigger 375 is controlled by means of a potentiometer 382 provided in the grid circuit of the tube 374, and when the charge on the condenser 376 reaches a value determined by the setting of the potentiometer 382, the Schmitt trigger 375 fires.

As noted above, the potential of the control grid 369 of the cathode follower 371, and thus the firing voltage of the Schmitt trigger 375, is controlled by the charge across the condenser 376. The instant structure is so designed that it is necessary for several pulses to be received from the photocell before the condenser 376 is charged sufficiently to permit the Schmitt trigger 375 to fire, and in this way prevents noise in the circuit from firing the Schmitt trigger 375 and permits the positive identification of bits, if one is present, at each bit position.

As was mentioned above, the plate 378 of the Schmitt trigger 375 is coupled to the control grid 379 of the single shot multivibrator 381. The single shot multivibrator 381 comprises vacuum tubes 387 and 388, the tube 387 thereof being normally non-conducting, and when the Schmitt trigger 375 is fired, the grid 379 is driven sufficiently positive to fire the single shot 381. The plate 389 of the tube 388 is connected to the control grid 391 of a power tube 392, the plate 393 thereof being connected through a line 394 to the shift register disclosed in Fig. 8, and it will now be clear that, if a bit is present, the Schmitt trigger 375 fires and a bit pulse is entered into the shift register.

In order to permit bit detection at each bit position, it will be understood that it is necessary to completely discharge the condenser 376 between bit positions, and a dunking tube 384 is provided for this purpose. The tube 384 is normally biased below cutoff, and the plate 385 thereof is connected to the cathode 368 of the diode 366. It will be understood that, when the tube 384 conducts, the condenser 376 is discharged. A line 386 is provided to connect the grid 387 of the tube 384 to the plate 283 (Fig. 9a) of the power tube 274. Each read cycle pulse generated by the multivibrator 268 raises the potential of the plate 283 of the power tube 274, and the resulting positive pulse is applied through the line 386 to the control grid 387 (Fig. 10) of the dunking tube 384. In this way, it will be seen that the condenser 376 is dunked to remove the charge thereacross by each read cycle pulse to thereby clear the detector to enable it to detect the next bit.

As will become clear later herein, it is desired to blank the detector during certain operations. This is accomplished by closing the "and" gate 346. It will be recalled that the gate 346 is closed when the trigger 358 is on, which trigger is turned on by the application to the control grid 396 of the tube 357 of a negative pulse. A line 397 is coupled between the control grid 396 and the cathode 337 (Figs. 9b and 9c) of the cathode follower 338. The cathode 337 (Fig. 9b), as noted above, drops from a high potential to a low potential when the eighth read cycle pulse is generated by the multivibrator 268, and it is the negative-going edge of this pulse that turns the trigger 358 (Fig. 10) on, thereby closing the gate 346 and blanking the detector to prevent the entry of further signals from the photocell, and it is not until the next key hole is encountered by the cathode ray beam that the trigger 358 is pulsed to open the gate 346.

It should be noted in connection with the description of the detector that the shift pulses entered into the shift register are generated by the read cycle multivibrator 268 (Fig. 9a) and, therefore, that each time a "dunking" pulse is supplied to the detector to discharge the condenser 376 (Fig. 10), a shift pulse is entered into the shift register. The plate 283 (Fig. 9a) of the power tube 274 is coupled through a line 801 to the control grid 802 (Fig. 9b) of a single shot multivibrator 803 comprising tubes 804 and 805. The plate 806 of the tube 805 is connected to the control grid 807 of a power tube 808 by a line 809. The single shot 803 is arranged with the tube 804 thereof being normally biased below cutoff; however, each read cycle pulse is adapted to trigger it to thereby drive the grid 807 of the power tube 808 positive for a short period of time determined by the time constant of the single shot. The resulting negative pulse taken from the plate 811 of the tube 808 is entered into the shift register (Fig. 8), through a line 395, as a shift pulse. The function of the shift pulses will be explained in connection with the description of the shift register.

Horizontal jizzle generator

As was noted above, it is desired to add a small high frequency voltage, i.e., the horizontal jizzle voltage, to the horizontal deflection voltage while the beam is traversing a read cycle to provide positive identification of bits. Additionally, the horizontal jizzle voltage effectively widens the beam during its search for bits. Referring to Fig. 11, the grid 401 of one tube 402 of a bistable trigger 403 is suitably coupled through a line 404 to the plate 256 (Fig. 9a) of the delay multivibrator 255. It will be recalled that the plate 256 of the multivibrator 255 is arranged to drop in potential shortly after an impulse resulting from a key hole is received. The negative impulse taken from the plate 256 is arranged to turn the trigger 403 (Fig. 11) off, said trigger normally being on, thereby lowering the potential of the plate 405 of the second tube 406 thereof. The plate 405 is connected through a line 407 to the control grid 408 of a tube 409, the plate 411 of which is connected to the control grid 412 of one tube 413 of a free-running multivibrator 414. When the trigger 403 is on, the tube 409 conducts and the potential of the multivibrator grid 412 is lowered below cutoff, thereby preventing oscillation of the multivibrator 414. When, however, the trigger 403 is off, the tube 409 is cut off, and the multivibrator 414 is rendered operative. (It should be noted that the frequency of oscillation of the multivibrator 414 is controlled by varying the arm 416 of a potentiometer 417 to thereby vary the voltage to which the grid 412 is returned.)

The plate 418 of the tube 413 is connected to the control grid 419 of a cathode follower 420, the cathode 421 of which is coupled through a filter 422, comprising a resistor 423 and a condenser 425, to the grid 426 of a cathode follower 427. It is the function of the filter 422 to integrate the square wave output of the multivibrator 414 to provide a saw-tooth waveform which is utilized as the horizontal jizzle voltage. The cathode 428 is connected to one side of a potentiometer 429, the other side of which is grounded, and the arm 431 thereof is connected through an adding resistor 432 to a line 433 which in turn is connected to each of the control grids 434 and 435 of two tubes 436 and 437, respectively. The tubes 436 and 437 are connected in parallel as a cathode follower 438, and the cathodes 439 and 441 thereof are connected through a line 442 to the horizontal sweep circuit, the potential of the line 442 being arranged to control the total horizontal deflection voltage applied to the horizontal deflection plates of the cathode ray tube.

The plate 405 of the trigger 403 is connected through a line 444 to the control grid 445 of an inverter tube 446, the plate 447 of which is connected through a condenser 451 to the control grid 426 of the cathode follower 427. It will be recalled that the output of the multivibrator 414 is capacity-coupled to the filter 422, a condenser 424 being provided for this purpose, and, as is well known to those familiar with such circuits, as soon as the multivibrator 414 is turned on, a transient voltage due to the presence of the condenser 424 and a resistor 448, and having a waveform similar to that shown in the drawing, appears on the grid 426 of the cathode follower 427, the jizzle voltage being imposed thereon. This transient is undesirable, and it is for this reason that a condenser 451 and resistor 449 are provided. It will be noted that when the trigger 403 is turned off, thereby turning on the multivibrator 414, the plate 405 of the tube 406 drops in potential, thus lowering the grid 445 of the tube 446 and raising the potential of the plate 447 thereof. The resulting positive pulse taken from the plate 447 is differentiated by the condenser 451 to provide a waveform substantially similar to that shown across the resistor 449. It is to be noted that, by the proper choice of the condensers 424 and 451 and of the resistors 448 and 449, the negative-going transient across the resistor 449 may be made equal but opposite in polarity to the aforementioned unwanted transient, and when these two transients are mixed on the grid 426 of the tube 427 the unwanted transient is cancelled. It will be seen that in this way a pure high frequency alternating signal is created which is taken from the cathode 428 of the cathode follower 427, thereby providing the horizontal jizzle voltage, as is desired.

Upon completion of the read cycle, it is desired to stop the addition of the jizzle voltage to the horizontal deflection system, and for this purpose the grid 452 of the tube 406 is connected through a line 453 to the cathode 337 (Fig. 9b) of the cathode follower 338. As mentioned above, the cathode 337 drops in potential upon completion of the read cycle. Thus, it will be seen that after eight read cycle pulses have been generated the grid 452 (Fig. 11) of the tube 406 is driven negative, thereby turning the trigger 403 on and rendering the multivibrator 414 inoperative.

Print-out delay

Upon completion of a read cycle it is desired to read out the character then stored in the shift register, and, since mechanical printing is illustrated herein, it will be understood that a time delay is necessary to permit the typewriter to print the character before the next character is read. Referring to Fig. 9b, it will be seen that the plate 456 of the trigger 307 is connected through a line 457 to the control grid 458 (Fig. 9c) of a power tube 459, the plate load resistor 461 of which is tapped at 462 and is coupled by a line 463 to the plate 464 (Fig. 12) and control grid 465 of two tubes 466 and 467, respectively. The tubes 466 and 467 comprise a single shot multivibrator 468, the tube 467 thereof being arranged normally to conduct and the tube 466 being normally cut off.

It will be recalled that the trigger 307 (Fig. 9b) is turned on by the eighth pulse generated by the read cycle multivibrator 268 and that as a result the plate 456 rises in potential. When the plate 456 rises, the plate of the power tube 459 (Fig. 9c) drops and a negative-going pulse is applied to the control grid 465 (Fig. 12) of the multivibrator tube 467, thereby triggering the multivibrator. The plate 471 of the tube 467 is connected to each of the control grids 472 and 473 of two tubes 474 and 475 which are connected in parallel as cathode follower 476. The cathodes 477 and 478 are connected through a line 479 to one side of a relay 481 (Fig. 8), the other side of which is grounded. It will now be understood that, upon completion of the read cycle, the trigger 307 (Fig. 9b) is turned on, thereby triggering the single shot multivibrator 468 (Fig. 12), and as a result the cathode follower 476 which is normally biased to restrict conduction is rendered freely conductive, thereby energizing the relay 481 (Fig. 8), for a period of time determined by the duration of the pulse emitted by the single shot multivibrator 468. As will be more fully explained later herein, in connection with the description of the shift register, read-out of a character stored in the shift register is initiated when the relay 481 is energized.

The load resistor 482 (Fig. 12) connected to the plate 471 of the tube 467 is tapped at 483, and a line 484 connected to the tap 483 is coupled to the plate 485 and to the control grid 486 of two tubes 487 and 488, respectively, which comprise another single shot multivibrator 489. The tube 488 is normally conductive, the tube 487 being normally cut off. It will be seen, however, that the trailing, negative-going edge of the positive pulse generated by the multivibrator 468 and taken from the plate 471 thereof triggers the multivibrator 489, thereby momentarily cutting off the tube 488 and rendering the tube 487 conductive. The multivibrator 489 is triggered, therefore, after a period of time determined by the time constant of the multivibrator 468.

The plate 491 of the tube 488 is connected to the control grid 492 of an inverter tube 493, the plate 494 of which is connected to the control grid 495 of a power tube 496. When the multivibrator 489 is triggered, the resulting positive pulse taken from the plate 491 thereof is inverted by the tube 493 and amplified and inverted by the tube 496, and the timed, positive pulse taken from the tap 497 of the load resistor 498 connected to the plate 499 of the tube 496 is fed through a line 501 to the plate of the diode 147 (Fig. 7) and also to the plate 502 (Fig. 9a) and the control grid 503 of two tubes 504 and 505, respectively.

While the line 501 is high, the plate, and thus the cathode of the diode 147 (Fig. 7), is likewise high. When the line 501 drops in potential, the cathode of the diode 147 also drops and a negative impulse is applied to the control grid 145 of the trigger 151, thereby turning said trigger off, which, as explained above, results in the resumption of the horizontal sweep. Thus, after the read cycle is completed and after a period of time determined by the time constants of multivibrators 468 (Fig. 12) and 489, the horizontal sweep is again started, thereby providing the delay necessary for print-out. In the present embodiment, the time constant of the multivibrator 468 is arranged to provide a pulse having 70-millisecond duration, and the time constant of the multivibrator 489 is arranged to provide a positive pulse having 50-millisecond duration. As noted above, the trailing edge of the 70-millisecond pulse taken from the plate 471 of the multivibrator 468 triggers the multivibrator 489, and the trailing edge of the 50-millisecond pulse taken from the plate of the multivibrator 489 turns the trigger 151 off. As a result, the horizontal sweep is resumed 120 milliseconds after completion of the read cycle, print-out being accomplished during this period.

It will be recalled that the read cycle described above terminated with the cathode ray beam being returned to the key hole and that at this time the horizontal sweep is again initiated to search for the next key hole of the next character to be read. To prevent a read cycle from being initiated if and when the beam encounters a bit in the lower position of the right-hand bit column, i.e., position V, it is necessary to blank the system for a short period of time after the horizontal sweep is resumed, to insure that the beam is moved past the second bit column before a read cycle can be initiated, and for this reason means are provided to blank the pulse shaper, i.e., to close the gate 194 (Fig. 6), with the leading edge of the eighth pulse generated by the read cycle multivibrator 268 and to maintain it so blanked until the beam is moved past the second bit column.

An "and" gate 545 (Fig. 9c), comprising four diodes 533 to 536 inclusive, is provided in series with the control grid 527 (Fig. 9a) of a power tube 525, the plates 529 through 532 (Fig. 9c) thereof being common and coupled to the control grid 527 by a line 528. The tap 523 (Fig. 9a) in the load resistor 524 provided in the plate circuit of the power tube 525 is coupled to the control grid 521 of a tube 514, which, with a tube 513, comprises a bistable trigger 515. The trigger 515 is assumed to be normally off; however, it will be seen that, when the plate 526 of the power tube 525 drops in potential, the trigger 515 is turned on and that as a result the line 204 connected to the plate 516 thereof goes up in potential. The line 204, it will be recalled, is connected to the control grid 518 (Fig. 6) of the inverter tube 202. When the trigger 515 is on, therefore, the grid 518 of the inverter 202 is at a high potential, and while this condition exists the gate 194 is closed, thereby preventing passage of signals from the photocell into the pulse shaper and blanking the system.

The cathode 537 (Fig. 9c) of the diode 533 is connected through a line 540 (Figs. 9c and 9b) to the cathode 337 (Fig. 9b) of the cathode follower 338. The cathode 541 (Fig. 9c) of the diode 534 is connected through the line 302 (Figs. 9c and 9b) to the cathode 301 (Fig. 9b) of the cathode follower 299. The cathode 542 (Fig. 9c) of the diode 535 is connected through the line 289 (Figs. 9c and 9b) to the cathode 288 (Fig. 9b) of the cathode follower 287, and the cathode 543 of the diode 536 is connected through a line 544 (Figs. 9c, 9b and 9a) to one side of each of two resistors 538 and 539 (Fig. 9a). The other side of the resistor 539 is connected to −100 volts, the other side of the resistor 538 being connected to the plate 283 of the power tube 274. It will be understood that the line 546 (Fig. 9c) connected to each of the plates of the four diodes 533 through 536 is high only if all four of their cathodes are high. It will be recalled that the seventh read cycle pulse turns all three of the triggers 282, 295 and 307 (Fig. 9b) off, and additionally raises the plate potential of the power tube 274 (Fig. 9a). At this time, therefore, each of the cathodes 537, 541, 542 and 543 (Fig. 9c) are high, thus raising the potential of the line 546 until the eighth read cycle pulse is generated. As was mentioned above, the plates of the "and" gate diodes 533 through 536 are coupled to the control grid 527 (Fig. 9a) of the power tube 525, and when the line 546 goes up the plate 524 of the tube 525 goes down, the negative-going edge of the resulting pulse being arranged to turn the trigger 515 on, thereby blanking the pulse shaper as described above until the trigger 515 is again turned off.

It was mentioned above that the potential of the line 501 (Fig. 12) was used to control vacuum tubes 504 (Fig. 9a) and 505 which comprise the single shot multivibrator 506. The tube 505 is normally conducting, the tube 504 being normally cut off, and the trailing edge of the 50-millisecond pulse taken from the line 501 is arranged to trigger the multivibrator 506. The tap 507 of the load resistor 508 provided in the plate circuit of the tube 505 is coupled through a line 511 to the control grid 512 of the tube 513. As noted above, the tube 513 forms one-half of the trigger 515, and when the single shot multivibrator 506 is triggered, the trailing, negative-going edge of the resulting positive pulse present on the line 511 turns the trigger 515 off. Thus, after the 120-millisecond delay provided for print-out, the single shot multivibrator 506 is triggered and the trailing edge of the resulting timed pulse is arranged to turn off the trigger 515 to thereby unblank the pulse shaper by opening the gate 194 (Fig. 6). The duration of the pulse generated by the multivibrator 506 is controlled by the time constant thereof to provide sufficient time for the horizontal sweep circuit to move the cathode ray beam past the second bit column before unblanking the system.

Shift register

The shift register may be of any convenient design, the one utilized herein being substantially the same as the one described in the December 1949 issue of Electronics at page 186. Referring to Fig. 8, it will be seen that the shift register comprises eight bistable trigger circuits 567 through 574. The first trigger 567 includes two tubes 576 and 577. It will be recalled that the bit pulses from the detector (Fig. 10) are fed through a line 394 to the input of the shift register. The line 394 is coupled to the control grid 578 (Fig. 8a) of the tube 576. The trigger 567 is normally on, i.e., the tube 576 thereof is normally conducting; however, upon receipt of a negative-going bit pulse from the detector, the tube 576 is cut off, thereby turning the trigger 567 off. Thus, when a bit pulse is received, the trigger 567 is turned off, but it remains on in the absence of such a pulse.

Upon receipt of a shift pulse, each trigger of the shift register is arranged to assume the condition of the trigger immediately preceding it, and when a shift pulse is received the trigger 568 immediately following the trigger 567 assumes the condition of stability of the trigger 567, the trigger 569 next following the trigger 568 assumes the condition of stability of the trigger 568, etc. Shift pulses are taken from the read cycle generator (Fig. 9) and are entered into the shift register through a line 395, the line 395 being coupled to the control grid 579 of the tube 577 and also to both of the control grids of each of the remaining seven triggers 568 to 574 inclusive. The seven triggers 568 through 574, like the trigger 567, are normally on and each is preconditioned by the condition of the preceding trigger to assume that condition upon receipt of a shift pulse.

It will be noted that in the case of the first seven triggers the plate of the left-hand tube of each, as viewed in the drawing, is connected through a line 581, through a voltage divider resistor 582, and through a diode 583 to the control grid of the right-hand tube of the next following trigger, and that the plate of the right-hand tube of each such trigger is connected through a line 584, through a voltage divider resistor 585 and through a diode 586 to the control grid of the left-hand tube of the next following trigger. When one of the triggers, the trigger 567 for example, is off, the plate 587 of the tube 576 is high and the diode 583 connected to the grid 589 of the trigger 568 is biased thereby in the reverse or high impedance direction. Also, at this time, the plate 591 of the tube 577 is low, thus biasing the diode 586, connected to the grid 593 of the tube 594, in the forward or low impedance direction. It will be understood that, when a negative-going shift pulse appears on the line 395, it affects only the tube of a trigger associated with a diode biased in the forward direction, since such pulses are blocked by a diode biased in the reverse direction. When, in the present example, the shift pulse is generated, the tube 594 of the trigger 568 is cut off, thereby turning the trigger 568 off. (It should be noted that each shift pulse insures that the first trigger 567 is turned on before receipt of the next bit pulse.) If, therefore, one of the triggers is off, the next shift pulse turns the trigger next following off. On the other hand, when one of the triggers is on, the next following trigger is turned on by the next shift pulse.

It will be recalled that at the end of the eighth pulse generated by the read cycle generator a read cycle has been completed and that the trailing edge of the eighth read cycle pulse causes the energization of the read-out relay 481 (Fig. 8c). The cathode ray beam is arranged to examine the eight positions shown in Fig. 3 and, as mentioned earlier herein, positions I and V are not utilized as bit storage positions. For this reason, the first and fifth triggers 567 and 571 of the shift register are not utilized for read-out. The plates of the left-hand tubes of the remaining six triggers 568, 569, 570, 572, 573 and 574 are connected to the control grids of six cathode followers 601 through 606, respectively, the cathodes of which control the grid potential of six thyratrons 607 through 612, respectively, and when one of the aforementioned triggers is on, the associated thyratron is biased to prevent conduction thereof. However, when one of these triggers is off, the associated thyratron is biased to permit conduction.

The plates of each of the thyratrons 607 through 612 are connected to a common line 613, which in turn is connected through a set of normally open contacts 481a of the relay 481 to +75 volts. Additionally, six decoding relays 614 through 619 are provided in series with the cathodes of these thyratrons. Thus, when the relay 481 is energized by the trailing edge of the eighth read cycle pulse, certain of the decoding relays 614 through 619, corresponding to off stages of the shift register, are energized since the thyratrons associated therewith are rendered conductive. The contacts of the relays 614 through 619 are arranged in a conventional matrix, as shown in Fig. 15, and are adapted to drive the typewriter in any well known manner which forms no portion of the invention and need not be described herein.

It will be noted, however, that when the relay 481 is energized, a set of contacts 481b thereof are closed, thereby energizing a relay 620 and connecting its armature 621 to a line 624. When the relay 620 is de-energized, the armature 621 is connected through a resistor to +150 volts, and under these conditions a fairly large condenser 623 connected between the armature 621 and ground is charged. When the relay 620 is energized, the armature 621 is connected to the line 624, which in turn is connected to the matrix shown in Fig. 15, and the condenser 623 is discharged through the matrix, effecting print-out. After each read cycle, therefore, the relay 481 is energized and the character stored in the shift register is read out and printed by the typewriter.

Vertical jizzle generator

If a line of coded characters is sufficiently skewed with respect to the normal horizontal path of the cathode ray beam, it will be understood that the structure described thus far would permit the beam to miss key holes, i.e., to go above or below them, and it is for this reason that a small high frequency voltage, hereinafter referred to as the vertical jizzle voltage, is added to the vertical deflection system. The vertical jizzle voltage effectively widens the cathode ray beam during its search for key holes. Additionally, means to be described later herein are provided to correct for skew at each key hole, which means are arranged to supply a correction voltage, corresponding to the skew, to the vertical system to thereby center the beam on the key hole.

The vertical jizzle generator comprises a free-running multivibrator 681 (Fig. 13), including tubes 682 and 683, the operation of which is controlled by the plate potential of a triode 684. The plate 686 of the triode 684 is connected to the control grid of the tube 682, and it will be understood that, when the triode 684 is conducting, the plate 686 thereof is at a potential sufficiently low to cut off the tube 682 and prevent the operation of the multivibrator. When, however, the triode 684 is cut off, the multivibrator 681 is free to oscillate since the potential of the plate 686 is then above the cutoff potential of the tube 682. The triode 684 is controlled by the condition of stability of a bistable trigger 638 comprising vacuum tubes 639 and 641. It will be assumed that the trigger 638 is normally on, i.e., that the tube 639 thereof is conducting, and under these conditions it will be noted that the plate 642 of the tube 639 is low, thus biasing the grid 685 of the tube 684 below cutoff and thereby permitting the multivibrator 681 to oscillate.

The grid 644 of the trigger tube 639 is coupled through a line 645 to each of the plates of two diodes 646 and 647, the cathodes of which are coupled to lines 648 and 186, respectively. The diodes 646 and 647 comprise an "or" gate, and it will be noted that, when the potential of either of the lines 648 or 186 drops, a negative impulse is applied to the grid 644 of the trigger tube 639, thereby turning the trigger 638 off. The line 648 is connected to the plate 256 (Fig. 9a) of the delay multivibrator 255, and the line 186 is connected to the plate 187 (Fig. 7) of the tube 185. When the trigger 638 is turned off, the plate 642 thereof goes up, thereby raising the grid 685 of the triode 684 and biasing the grid of the tube 682 to prevent the multivibrator 681 from oscillating. It will now be clear that the multivibrator 681 is turned off when either the cathode ray beam strikes a key hole or when the beam is reset to the left, since at either of these times the lines 648 or 186 drop in potential.

The grid 649 of the trigger tube 641 is coupled through a line 651 to each of the plates of two diodes 652 and 653, the cathodes of which are coupled to lines 654 and 655, respectively, and it should be clear that, when the potential of either of the lines 654 or 655 drops, a negative-going impulse is applied to the grid 649 of the tube 641, which impulse turns the trigger 638 on. The line 654 is connected to the plate 499 of the tube 496 (Fig. 12), and the line 655 is connected to the plate 135 of the Schmitt trigger 132 (Fig. 5a). When, therefore, the potential of either of the lines 654 or 655 drops, as it does at the end of the print-out delay or when a signal to start the horizontal sweep is received from the vertical search system, the vertical jizzle generator is turned on, but when the potential of either of the lines 648 or 186 drops, as it does shortly after a key hole is sighted or a reset pulse has been generated, the vertical jizzle is turned off.

The plate 687 of the multivibrator tube 683 is connected to the control grid 711 of a cathode follower 712, the cathode 713 of which is coupled through an integrating network 714 to the control grid 717 of a cathode follower 718. The integrating network 714 comprises a resistor 715 and a condenser 716 and is provided to convert the square pulse generated by the multivibrator 681 into saw-tooth pulses in a well known manner. The cathode 719 of the tube 718 is connected to one side of a potentiometer 669, the other side of which is grounded, and the arm 671 of the potentiometer 669 is connected through a line 672 to one side of a vertical adding resistor 673, the other side of which is connected to the control grid 674 of a cathode follower 675. Thus when the multivibrator 681 is operative, i.e., when the trigger 638 is on, a small high frequency voltage is added to the vertical deflection voltage, the amplitude being determined by the setting of the arm 671 of the potentiometer 669, and it will be clear that the total vertical deflection voltage is directly controlled by the potential of a line 676 connected to the arm 677 of a potentiometer 678 placed between the cathode 679 of the cathode follower 675 and ground.

Vertical skew corrector

As was mentioned above, means are provided to add small correction voltages to the vertical deflection voltage to correct for skew. The skew corrector comprises a free running multivibrator 631 (Fig. 13) including vacuum tubes 632 and 633, and the operation of the multivibrator 631 is controlled by the plate potential of a triode 634, the grid 643 of which is connected in parallel with the grid 685 of the triode 684. The triode 634 controls the multivibrator 631 in a manner similar to the way the triode 684 controls the multivibrator 681, i.e., when the plate 635 of the triode 634 is low, the multivibrator 631 is inoperative. However, when the trigger 638 is off, thereby cutting off the triode 634, the multivibrator 631 oscillates.

The multivibrator 681 is symmetrical, and will be assumed for the purposes of this description that the positive and negative periods of the pulse train taken from the plate 687 thereof, when it is oscillating, are each equal to a period T, as indicated in Fig. 16. The multivibrator 631 is asymmetrical, for a purpose to be described, and when it is operative, the circuit constants thereof are arranged to provide a waveform on the plate 656 thereof having a positive period equal to $T+\Delta$, and a negative period equal to T, as shown in Fig. 16. If it were not for the structure next to be described, the multivibrator 631 would be free to produce an asymmetrical pulse train having periods of $T+\Delta$ and T. It will be noted that each of the multivibrators 631 and 681 are started in phase and that the potential of the plates 687 and 656 thereof rise together when the trigger 638 is turned off.

The plate 701 of the multivibrator tube 682 is coupled through a line 702 to the control grid 703 of a single shot multivibrator 704 comprising vacuum tubes 705 and 706, the tube 706 thereof being arranged normally to conduct, and a line 707 connected in the plate circuit of the vacuum tube 705 is coupled to the control grid 636 of the multivibrator tube 632. The single shot multivibrator 704 is suitably designed to provide a timed pulse having a duration of $T+B$, where B is less than $\Delta$, and it will be understood that when the plate 701 of the tube 682 drops in potential, as it does when the trigger 638 is turned off, the single shot multivibrator 704 is triggered and a timed, positive-going pulse having a period of $T+B$ appears on the line 707. At this time, the grid 636 of the tube 632 is up and the leading edge of the timed pulse created by the single shot multivibrator 704 thus has no effect on the multivibrator 631. When, however, the plate 708 of the single shot multivibrator 704 drops in potential, as it does after the period $T+B$, a negative impulse is applied to the grid 636 of the tube 632 which is sufficient to switch the multivibrator 631 prior to its normal period of $T+\Delta$. In this way, the multivibrator 631 is switched after a period of $T+B$.

It will now be understood that the plate 656 of the tube 633 drops in potential after a period of time equal to $T+B$, that it remains low for the normal period equal to T, and that it then rises for another period of T+B, etc. As noted above, the plate 687 of the tube 683 remains high for the period T, drops and remains low for the period T, again rises and remains high for the period T, etc. Each time it rises, the single shot multivibrator 704 is triggered and the trailing edge of each pulse created by the multivibrator 704 switches the multivibrator 681. Referring again to Fig. 16, it will be seen that after the first half cycle the pulses taken from each of the plates 687 and 656 are symmetrical but that they are out of phase, the pulses taken from the plate 687 being arranged to lead the pulses taken from the plate 656 by a period equal to B. As will become apparent, this phase displacement is provided to compensate for time lags inherent in the system, and by varying the period of the single shot 704 the amount of phase displacement is controlled.

The plate 656 of the tube 633 is connected to the control grid 658 of a cathode follower 659 by a line 657 and the cathode 661 of the tube 659 is coupled through an integrating network 662 comprising a resistor 665 and a condenser 667 to the control grid 663 of a cathode follower 664. The cathode 668 of the cathode follower 664 is coupled through a line 721 to the cathode 722 (Fig. 14) and to the plate 723 of diodes 724 and 725, respectively. The diode 724 and a diode 726 comprise an "and" gate 727, and the diode 725 and a diode 728 comprise another "and" gate 729. The plates of each of the diodes 724 and 726 are connected through a suitable resistor 730 to the control grid 732 of a cathode follower 733, and the cathodes of the diodes 725 and 728 are connected through a resistor 731 to the control grid 732. The potential of the cathode 734 of the cathode follower 733 is controlled by means of a potentiometer 735 provided in the plate circuit thereof to place it normally at ground potential, and it will be understood that the potential of the cathode 734 varies above or below ground potential an amount controlled by the potential of the control grid 732. The cathode 734 is connected through a line 736 to the plate 737 of a triode 738 and to the cathode 739 of a triode 741, the control grids 742 and 743 thereof each being connected to the cathodes of two diodes 744 and 745 by a line 746. The cathode 747 and the plate 748 of the tubes 738 and 741, respectively, are connected together and to the control grid 749 of a cathode follower 751 by a line 752. Additionally, a condenser 753 is connected between the line 752 and ground. A potentiometer 754 is connected between the cathode 755 of the cathode follower 751 and ground, and a line 756, connected to the arm 757 of the potentiometer 754, is connected to one side of a vertical adding resistor 758 (Fig. 13), the other side of which is connected to the control grid 674 of the cathode follower 675; and, as will become clear, the potential of the line 756 is added into the vertical adding network to correct for any skew present.

It will be recalled that the vertical jizzle voltage is identical to the pulsating voltage developed by the multivibrator 631, but that it leads in phase. Additionally, it will be understood that, when the cathode ray beam, upon which the vertical jizzle voltage has been superimposed, strikes a key hole, a correction voltage equal to the value of the jizzle voltage at that instant must be added into the vertical deflection system to zero the beam on the key hole. The pulsating voltage developed by the multivibrator 631 (Fig. 13) is applied to the line 721 in the form of a saw-tooth wave which simulates the vertical jizzle voltage. If the simulated jizzle voltage were in phase with the jizzle voltage, it will be understood that, if at the time the cathode ray beam strikes the key hole the instantaneous value of the potential of the line 721 were added to the vertical deflection system, the effect would be to center the beam on the key hole. The skew correction structure disclosed herein is arranged to apply the instantaneous value of the jizzle voltage at the time a key hole is encountered by the cathode ray beam to the vertical deflection plates to thereby shift the beam onto the key hole, but due to the time lags inherent in the system, i.e., due to the fact that it is not possible to gate the instantaneous value of the jizzle voltage instantaneously, it is necessary to anticipate the value of the jizzle voltage at any time. This is accomplished by arranging the actual jizzle voltage to lead the simulated jizzle or correction voltage by a period equal to the time lag. In this way, it will be seen that by the time the actual jizzle voltage senses a key hole and "notifies" the simulated jizzle voltage of that fact, the instantaneous value of the simulated jizzle voltage is suitable to provide the necessary correction.

A line 761 connected to the cathode 105 (Fig. 6) of the cathode follower 104 is connected to the cathode of a diode 762 (Fig. 14) which, along with the diode 763, comprises an "and" gate 764. It will be recalled that positive signals from the photocell are taken from the cathode 105 of the cathode follower 104 when the photocell is energized, and it will be clear that such a positive signal cannot pass through the gate 764 unless the cathode of the diode 763 is high. The cathode of the diode 763 is connected to the cathode 765 of a cathode follower 766, the grid 767 of which is connected through a line 768 to the plate 769 (Fig. 13) of the trigger 638. Thus, the cathode of the diode 763 is up while the trigger 638 is on, and when the trigger 638 is off, the cathode of the diode 763 is low and the "and" gate 764 is closed. The trigger 638 is on, it will be recalled, while the jizzle generator is operative, thereby maintaining the gate 764 open while the multivibrator 681 is operative.

The plates of the diodes 762 and 763 are coupled through a line 771 to the cathode 772 of the diode 726, to the control grid 773 of an inverter tube 774 and to the plate 775 of the diode 744. The plate 779 of the inverter tube 774 is coupled to the plate 781 of the diode 728. The cathode 772 of the diode 726 and the plate 781 of the diode 728 are clamped to ground by diodes 783 and 784, respectively. When the vertical jizzle generator is on and when a signal is received from the photocell, a positive pulse is applied to the cathode 772 of the diode 726, and a negative pulse is applied to the plate 781 of the diode 728, since the photocell signal is inverted by the inverter 774. At the instant these pulses appear on the cathode 772 and on the plate 781, the "and" gates 727 and 728, respectively, are opened and the value of the simulated jizzle voltage at that instant passes through one or the other of these gates, depending upon its polarity at that moment, to the control grid 732 of the cathode follower 733.

The tubes 738 and 741 comprise an electronic gate 786, and when the grids 742 and 743 thereof are below cutoff the gate 786 is closed. However, when these grids are biased sufficiently above cutoff the gate 786 is open. It will be understood that it is desired to open the gate when a signal from the photocell is present on the line 771. The grids 742 and 743 of the tubes 738 and 741, respectively, are connected through the line 746, and through a resistor 787 to the arm 788 of a potentiometer 789 which is connected between −100 volts and ground. The arm 788 of the potentiometer 789 is additionally connected to the plate of the diode 778 and to the plate of another diode 791, the cathode of the diode 791 being connected to the plate of the diode 745. The diodes 778 and 791 are clamping diodes and are provided to prevent the plates of the diodes 775 and 745 from going below the potential of the arm 788 of the potentiometer 789. It will be seen that, with the proper setting of the potentiometer 789, a photocell signal present on the line 771 passes through the diode 744 and raises the potential of the line 746 sufficiently to open the gate 786 for the duration of the signal. At this time the condenser 753 connected to the cathode 747 and the plate 748 of the tubes 738 and 741, respectively, is connected through the gate 786 to the cathode 734 of the cathode follower 733, and it is then free to charge an amount proportional to the correction voltage necessary to center the beam on the key hole. It will be understood that the charge across the condenser 753 controls the potential of the cathode 755 of the cathode follower 751 and that the potential of the line 756 is adjusted by means of the potentiometer 754 to add the necessary corrective voltage increment to the vertical deflection system.

At the end of each line of characters, it is desired to return the cathode ray beam to the start hole 27 corresponding to the line just read, and for this reason it is necessary to discharge the condenser 753 at the end of a line of characters. The plate 187 (Fig. 7) of the power tube 185 is coupled through a line 792 to the plate of the diode 745 (Fig. 14). It will be recalled that at the end of a line of characters a positive "dunking" pulse is taken from the plate 187 of the tube 185, which pulse is arranged to remove the horizontal sweep voltage from across the condenser 159. The dunking pulse is also applied through the line 792 to the plate of the diode 745 (Fig. 14), and when the dunking pulse raises the potential of the line 746, the electronic switch 786 is opened for a period of time sufficient to permit the condenser 753 to completely discharge therethrough. It will now be understood that, while the vertical jizzle generator is operative, necessary correction voltages are added into the vertical deflection system to center the cathode ray beam on each key hole and to thereby correct for any skew present in a line of characters at each keyhole. At the end of a line being read, all skew correction voltages stored on the condenser 753 are erased and the cathode ray beam is returned to the start hole preceding the line just read.

Operation

As was mentioned above, the reader of the invention is arranged to control the cathode ray beam to scan the left-hand column of a document from the top thereof toward the bottom until the beam "sees" a start hole, at which time the vertical scan is halted and a horizontal scan is initiated. Thus, when the start key 36 (Fig. 5a) is actuated, the trigger 44 is turned off, thereby starting the vertical sweep. Additionally, when the trigger 44 is turned off, the single shot multivibrator 117 is triggered to provide a timed pulse, the trailing edge of which is arranged to open the "and" gate 110. It will be noted that, after the vertical sweep is initiated and after a short delay provided by the single shot multivibrator 117, the gate 110 is opened. This delay is provided to prevent any signals from the photocell from passing therethrough until after the beam has been moved a short distance beyond its starting point by the vertical sweep circuits.

After the period of the single shot multivibrator 117, the gate 110 is opened and, when the cathode ray beam encounters a start hole, the signal from the photocell passes through the gate 110 and fires the Schmitt trigger 132, thereby lowering the potential of the plate 135 thereof and raising the potential of the plate 139. When the plate 135 drops, the trigger 44 is turned on, thereby stopping the vertical sweep; the trigger 151 (Fig. 7) is turned off, thereby initiating the horizontal sweep; the trigger 638 (Fig. 13) is turned on, thereby starting the vertical jizzle generator; and the single shot multivibrator 211 (Fig. 5b) is triggered, the trailing edge of the resulting pulse being arranged to turn off the trigger 207. (It will be recalled that, when the trigger 207 is turned off, the "and" gate 194 (Fig. 6) is opened, the gate 194 being opened after a short delay provided by the single shot multivibrator 211 (Fig. 5b) to permit the cathode ray beam to be moved by the horizontal sweep beyond the start hole before any signal from the photocell is permitted to pass through the gate 194. In this way, the device is prevented from initiating a false read cycle on the start hole since, if the system were not blanked for this short period, it is entirely possible that the start hole might be taken for a key hole.)

After the delay provided by the single shot multivibrator 211 (Fig. 5b), the gate 194 (Fig. 6) is opened and, when the cathode ray beam encounters a key hole, the resulting signal from the photocell passes through the gate 194 and fires the Schmitt trigger 222. When the Schmitt trigger 222 fires, the trigger 151 (Fig. 7) is turned on, thereby stopping the horizontal sweep immediately. The pulse from the Schmitt trigger 222 also triggers the single shot multivibrator 255 (Fig. 9a), the trailing edge of the resulting pulse being arranged to turn off the trigger 638 (Fig. 13), thereby turning off the vertical jizzle generator, to turn off the trigger 262 (Fig. 9a), thereby starting the read cycle, and to turn off the trigger 403 (Fig. 11), thereby starting the horizontal jizzle generator. It will be noted that, due to the delay provided by the single shot multivibrator 255, the horizontal sweep is stopped a short time before the read cycle is initiated and before the vertical jizzle is stopped. This delay is provided to permit any necessary skew correction to be made at this time. It will be recalled that the pulse from the Schmitt trigger 222 additionally turns off the trigger 358 (Fig. 10) and thereby opens the detector gate 346, the trigger 358 normally being maintained on to thereby normally maintain the detector gate 346 closed.

As noted above, when the trigger 262 is turned off, the read cycle is initiated, and at this time the cathode ray beam is moved to each of the positions II through VIII, as explained earlier herein, to determine the presence or absence of bits at each of the bit positions. It will be recalled that the seventh pulse generated by the read cycle multivibrator 268 (Fig. 9a) positions the cathode ray beam on position VIII (Fig. 3) and that the eighth read cycle causes the cathode ray beam to return to position I. The leading edge of the eighth read cycle pulse is arranged to turn on the trigger 515 (Fig. 9a) and, when the trigger 515 is on, the gate 194 (Fig. 6) is closed to prevent the passage of stop pulses from the photocell therethrough. The trailing edge of the eighth read cycle pulse returns the cathode ray beam to the key hole (it will be noted that the system is blanked, since the gate 194 is closed, while the cathode ray beam moves from position VIII to position I), triggers the single shot multivibrator 468 (Fig. 12) to start the delay period provided for print-out and to energize the relay 481 (Fig. 8c) to initiate print-out, turns on trigger 403 (Fig. 11) to thereby turn off the horizontal jizzle generator, and turns on trigger 358 (Fig. 10) to thereby close the gate 346 to the detector.

At the end of the delay provided for print-out by the multivibrators 468 and 489, the trigger 151 (Fig. 7) is turned off since the trailing edge of the pulse taken from the plate 496 (Fig. 12) is applied to the control grid 145 of this trigger. When the trigger 151 is turned off, it will be recalled, the horizontal sweep is resumed. Additionally, the trailing edge of the delay pulse taken from the plate of the tube 496 (Fig. 12) turns on the trigger 638 (Fig. 13), thereby starting the vertical jizzle generator, and fires the single shot multivibrator 506 (Fig. 9a). The trailing edge of the resulting pulse taken from the plate 509 of the single shot multivibrator 506 is arranged to turn off the trigger 515 to thereby open the gate 194 (Fig. 6) and unblank the system by permitting stop pulses from the photocell to pass through the gate 194. It will be understood that, when the next key hole is encountered, the result will be the same as that described above.

When the horizontal sweep has moved the beam sufficiently to the right, such as to the end of a line of characters, i.e., when the condenser 159 (Fig. 7) is charged sufficiently to fire the Schmitt trigger 173, a dunking pulse is created which is arranged to discharge the condenser 159 and thereby return the cathode ray beam to its leftmost position. The dunking pulse taken from the plate 187 of the tube 185 is arranged also to open the electronic switch 786 (Fig. 14) to thereby permit the condenser 753 to discharge therethrough. (It will be recalled that the potential across the condenser 753 is utilized for skew correction and that it is desired to remove all correction voltages therefrom at the end of a line being read.) Additionally, when the Schmitt trigger 173 fires, the trigger 151 (Fig. 7) is turned on, thereby stopping the horizontal sweep, trigger 207 (Fig. 5b) is turned on, thereby closing the gate 194 (Fig. 6) and blanking the system; and trigger 44 (Fig. 5a) is turned off, thereby starting the vertical sweep. As soon as the trigger 44 is turned off, the single shot multivibrator 117 is triggered and the trailing edge of the resulting pulse turns off the trigger 122 and thereby opens the gate 110 to permit passage of stop pulses from the photocell. As mentioned above, it is the function of the delay multivibrator 117 to provide time for the cathode ray beam to be moved beyond the start hole from which it is being moved to thereby prevent false start signals from being received. It will be understood that each line of characters on the page is read in a manner similar to that described above and, when the cathode ray beam is moved by the vertical sweep downwardly sufficiently to charge the condenser 56 (Fig. 5b) to a potential equal to the threshold firing voltage of the Schmitt trigger 82, the Schmitt trigger 82 fires, thereby creating a dunking pulse which results in discharging the condenser 56 and returning the cathode ray beam to the upper left-hand corner of the page. In order to re-read the page, it is necessary to reactuate the start key 36.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A data reading device comprising means for sensing data recorded in characters on a document, said means including a cathode ray beam, means for controlling said cathode ray beam to scan along a first line on said document, means operable in response to a first piece of positional data recorded on said first line for controlling said cathode ray beam to scan a second line of said document, said second line being substantially perpendicular to the first line, means operable in response to a second piece of positional data recorded on said second line and associated with the characters recorded on said document for controlling said cathode ray beam to scan said characters, and means cooperating with said sensing means for identifying said characters.

2. A machine for reading coded characters from a document wherein a line notation is provided adjacent a line of coded characters to indicate the presence thereof and a character notation is provided adjacent a coded character in a line to indicate the presence thereof, comprising means for sensing said notations and said coded characters, said sensing means including a cathode ray beam, means for controlling said cathode ray beam to scan said line notations for sensing a line of coded characters, means operable in response to a sensed line notation for controlling said cathode ray beam to scan the character notations in a sensed line of coded characters, means operable in response to a sensed character notation for controlling said cathode ray beam to scan the coded character adjacent thereto, means cooperating with said sensing means for identifying sensed characters, means for controlling said cathode ray beam to resume scanning said character notations after a coded character has been identified, means for causing said cathode ray beam to resume scanning said line notations after a line of coded characters has been identified.

3. A data reading machine comprising means for sensing data recorded on a document, said sensing means including a beam, means for focusing said beam on said document, means for controlling said beam to sweep over said document, means responsive to sensed data for creating a signal, means responsive to a said signal for stopping said sweep, means for centering said beam on said sensed data, said centering means including means for creating a first alternating voltage arranged to displace said beam on either side of an imaginary line, means for creating a second alternating voltage symmetrical to said first voltage and arranged to displace said beam when gated, said second voltage being arranged to lag said first voltage, and means responsive to a signal from said sensing means adapted to momentarily gate said second voltage, whereby said beam is displaced an amount corresponding to the instantaneous value of said first voltage at the time said data is sensed and said beam is shifted to render said imaginary line coincident with said sensed data.

4. A machine for reading coded characters from a document wherein a line notation is provided adjacent a line of coded characters to indicate the presence thereof and a character notation is provided adjacent coded characters to indicate the presence thereof, comprising means for sensing said notations and said coded characters, said sensing means including a cathode ray beam, means for controlling said cathode ray beam to scan said line notations, means operable in response to a sensed line notation for controlling said cathode ray beam to scan the character notations in the line of coded characters associated with a sensed line notation, means operable in response to a sensed character notation for centering said cathode ray beam thereon and for controlling said cathode ray beam to scan the coded character associated with said character notation, means cooperating with said sensing means for identifying scanned characters, means for controlling said cathode ray beam to resume scanning the character notations in said line after a coded character has been identified, and means for causing said cathode ray beam to resume scanning said line notations after a line of coded characters has been identified.

5. A data reading machine comprising means for focusing a cathode ray beam on a document, means for creating a first deflection voltage for moving said beam across said document, means for creating a second deflection voltage for widening said beam while it is moving across said document, means associated with said beam for sensing information recorded on said document, means for stopping said beam when information is sensed, and means cooperating with said second deflection voltage for positioning said beam on said sensed information.

6. A data reading machine comprising means for sensing data recorded on a document, said sensing means including a beam, deflection means for controlling said beam to sweep across the document from a first position to a second position, means responsively to the sensing means for stopping said sweep when said beam encounters datum recorded on said document, means coupled to the deflection means for changing the path of said sweep when said path is skewed relative to data recorded on said document, and means coupled to the deflection means for returning said beam to said first position when it sweeps beyond said second position.

7. A data reading machine comprising means for sensing indicia representative of data recorded on a document, means for controlling said sensing means to scan said document in search of recorded indicia, means responsive to sensed positional indicia recorded on said document for stopping said scan and for registering said sensing means on said sensed positional indicia, means operable to control said sensing means to scan bit positions of a coded character associated with said positional indicia, means for identifying a scanned coded character, means for re-registering said sensing means on said sensed positional indicia after the bit positions of said coded character have been scanned, means for controlling said sensing means to resume scanning said document to search for additional recorded indicia after said scanned character has been identified, and means for blanking said sensing means for a short period of time after it leaves said positional indicia whereby said sensing means is prohibited from rescanning said coded character.

8. A data recording machine comprising means for sensing indicia representative of data recorded on a document, means for registering said sensing means adjacent a coded character recorded on said document, said character having indicia representative of bits recorded in predetermined bit positions, means for controlling said sensing means to inspect each said bit position, said means including means for generating a number of pulses adapted to control said sensing means to inspect successive bit positions, means for rendering said pulse generating means ineffective when all said bit positions have been inspected, said means being arranged to re-register said sensing means adjacent said coded character, and means for identifying said inspected character.

9. A data reading machine comprising means for sensing indicia representative of data recorded on a document, means for controlling said sensing means to scan a first portion of said document, means operable in response to sensed line position indicia recorded on said first portion for controlling said sensing means to scan a second portion of said document, means for blanking said sensing means for a predetermined period of time after said line position indicia is sensed, means responsive to sensed character position indicia recorded on said second portion for controlling said sensing means to scan a coded character recorded on said document and associated with said character position indicia, means for identifying said scanned character, means for controlling said sensing means to resume scanning said second portion, means for blanking said sensing means for a predetermined period of time after said scan is resumed, means for controlling said sensing means to resume scanning said first portion after said second portion has been scanned, and means for blanking said sensing means for a predetermined period of time after said second portion has been scanned, whereby said data reading machine is controlled solely by the indicia recorded on said document to identify each coded character recorded thereon.

10. A data reading machine comprising means for sensing data recorded on a document, means for controlling said sensing means to scan the document, means responsive to sensed data for controlling the sensing means to stop scanning said document, registering means associated with the sensing means for registering said sensing means on sensed data, said registering means including means for shifting said sensing means back and forth across an imaginary center line, and means responsive to the displacement of sensed data from said center line for controlling said sensing means to shift said center line to correspond with said sensed data.

11. An electronic device for sensing characters from a document wherein each character is identified according to indicia recorded in selected portions of a plurality of rows of such portions, comprising means for generating a cathode ray beam, means for causing said beam normally to scan a line of said document in a first predetermined pattern, means for detecting when a character on said line is encountered by said beam, means under control of said detecting means for causing said beam to scan said rows of the detected character by incremental steps forming a second predetermined pattern, means for detecting the indicia recorded in the steps of said second pattern, and means for restoring the first scanning pattern of the beam upon completion of the incremental scanning of the second pattern.

12. A data reading machine comprising means for sensing data recorded on a document, means for controlling said sensing means to scan said document, means responsive to sensed data for controlling said sensing means to stop scanning said document, and means for registering said sensing means on sensed data whereby the effect of the skew of said document relative to said sensing means is minimized, said registering means including a jizzle means for impressing an oscillatory signal upon the sensing means to effectively broaden the scan prior to sensing data, said registering means further including a skew correcting means sensitive to the jizzle means and operable to center the scan in accordance with the oscillatory signal at the instant when a bit of data is sensed.

13. In a machine for reading coded characters from a document, the combination of means for sensing bits of coded characters, means for registering said sensing means adjacent a coded character, said registering means including a jizzle means for impressing an oscillatory signal upon the sensing means to cause the sensing means to sense over a broadened area of the document, said registering means further including a skew correcting means sensitive to the jizzle means and operable to center the sensing means in accordance with the oscillatory signal at the instant when the key position is sensed, and means for controlling said sensing means to inspect each bit position of a coded character, said sensing means being arranged to indicate the presence of a bit and including a beam arranged to sweep back and forth across each bit position to determine the presence of a bit, whereby the presence of a bit at each bit position is determined.

14. A data reading machine comprising means for sensing data recorded on a document, means for registering said sensing means adjacent a coded character recorded on said document, said registering means including a jizzle means for impressing an oscillatory signal upon the sensing means to cause the sensing means to sense over a broadened area of the document, said registering means further including a skew correcting means sensitive to the jizzle means and operable to center the sensing means in accordance with the oscillatory signal at the instant when the key position is sensed, means for causing said sensing means to inspect each bit position of said coded character, and means for re-registering said sensing means adjacent said coded character after the bit positions thereof have been inspected.

References Cited in the file of this patent

UNITED STATES PATENTS

| | | |
|---|---|---|
| 2,222,934 | Blumlein | Nov. 26, 1940 |
| 2,402,916 | Schroeder | June 25, 1946 |
| 2,402,917 | Miller | June 25, 1946 |
| 2,513,112 | Shepherd | June 27, 1950 |
| 2,540,654 | Cohen | Feb. 6, 1951 |
| 2,565,266 | Potts | Aug. 21, 1951 |
| 2,596,741 | Tyler | May 13, 1952 |
| 2,600,168 | Klyce | June 10, 1952 |
| 2,663,758 | Shepard | Dec. 22, 1953 |
| 2,735,333 | Mitchell | Feb. 21, 1956 |
| 2,755,996 | Williams | July 24, 1956 |